United States Patent
Nadolski et al.

(10) Patent No.: US 10,084,805 B2
(45) Date of Patent: Sep. 25, 2018

(54) COMPUTER SYSTEM TO IDENTIFY ANOMALIES BASED ON COMPUTER-GENERATED RESULTS

(71) Applicant: SAS Institute Inc., Cary, NC (US)

(72) Inventors: William Robert Nadolski, Raleigh, NC (US); Emily Louise Chapman-McQuiston, Cary, NC (US); Julius Alton King, Apex, NC (US); Mauricio Alvarez Nino, Newport Beach, CA (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/897,263

(22) Filed: Feb. 15, 2018

(65) Prior Publication Data

US 2018/0241764 A1 Aug. 23, 2018

Related U.S. Application Data

(60) Provisional application No. 62/461,065, filed on Feb. 20, 2017.

(51) Int. Cl.
*H04L 29/06* (2006.01)
*G06N 3/04* (2006.01)
(Continued)

(52) U.S. Cl.
CPC ....... *H04L 63/1425* (2013.01); *G06N 3/0445* (2013.01); *G06N 3/08* (2013.01); *H04L 63/20* (2013.01)

(58) Field of Classification Search
CPC ...... H04L 63/1425; H04L 63/20; H04L 43/08
(Continued)

(56) References Cited

U.S. PATENT DOCUMENTS 6,219,649 B1 * 4/2001 Jameson ............... G06Q 10/06
700/99
9,317,404 B1 4/2016 Cohen et al.
(Continued)

OTHER PUBLICATIONS

Crainic et al., "Scenarion Clustering in a Progressive Hedging-Based Meta-Heuristic for Stochastic Network Design", CIRRELT, Aug. 2012, 21 pages.
(Continued)

*Primary Examiner* — Haresh N Patel

(57) ABSTRACT

One or more embodiments may include techniques to identify anomalies based on computer-generated results. Moreover, embodiments may include applying scenario rules to data to detect scenario violations and grouping the scenario violations into scenario clusters based on similar behavior performed by entities indicated by similarity metrics. embodiments include determining predictive ability values for each of the scenario clusters, ranking the scenario clusters based on the predictive ability values, and removing scenario clusters having predictive ability values below a threshold. In embodiments combinations of scenario clusters may be generated from the set of scenario clusters and the combinations of scenario clusters may be evaluated for effectiveness. Embodiments include generating scores for entities of the combinations of scenario clusters deemed effective, and provide results indicating whether one or more of the entities committed an anomaly based on the scores for each of the entities.

30 Claims, 28 Drawing Sheets

(51) Int. Cl.
*G06N 3/08* (2006.01)
*H04L 12/26* (2006.01)

(58) Field of Classification Search
USPC .......................................................... 726/23
See application file for complete search history.

(56) References Cited

U.S. PATENT DOCUMENTS

| | | | | |
|---|---|---|---|---|
| 9,454,785 B1* | 9/2016 | Hunter | ................... | G06Q 40/04 715/3 |
| 2003/0110396 A1* | 6/2003 | Lewis | ................ | H04L 63/0227 726/4 |
| 2008/0077570 A1* | 3/2008 | Tang | ................ | G06F 17/30684 705/3 |
| 2009/0122812 A1* | 5/2009 | Steiner | ................. | H04J 3/0652 370/503 |
| 2010/0030521 A1* | 2/2010 | Akhrarov | ............... | G06K 9/622 702/182 |
| 2011/0047084 A1* | 2/2011 | Manzalini | ............... | G06F 9/505 705/301 |
| 2011/0093854 A1* | 4/2011 | Blanc | ................... | G06F 9/5066 718/101 |
| 2011/0126111 A1* | 5/2011 | Gill | ........................ | G06F 21/55 715/736 |
| 2011/0231696 A1* | 9/2011 | Ji | ....................... | G06F 11/1438 714/3 |
| 2011/0261055 A1* | 10/2011 | Wong | .................. | H04L 41/0609 345/440 |
| 2012/0072421 A1* | 3/2012 | Bhattacharya | .... | G06F 17/30011 707/737 |
| 2012/0215560 A1* | 8/2012 | Ofek | | |
| 2012/0216243 A1* | 8/2012 | Gill | ......................... | G06F 21/55 726/1 |
| 2012/0224057 A1* | 9/2012 | Gill | ......................... | G06F 21/55 348/143 |
| 2013/0094705 A1* | 4/2013 | Tyagi | ................. | G06K 9/00369 382/103 |
| 2013/0262915 A1* | 10/2013 | Frank | .................. | H04L 41/0663 714/4.11 |
| 2013/0286198 A1* | 10/2013 | Fan | .................... | G06K 9/00785 348/143 |
| 2014/0258954 A1 | 9/2014 | De et al. | | |
| 2016/0203371 A1* | 7/2016 | Tyagi | ................. | G06K 9/00771 382/103 |
| 2017/0140090 A1* | 5/2017 | Kurtz | ................. | G06F 17/5081 700/99 |

OTHER PUBLICATIONS

Joudaki et al., "Improving Fraud and Abuse Detection in General Physician Claims: A Data Mining Study", Int J Health Policy Management, Nov. 10, 2015, 13 pages.

* cited by examiner

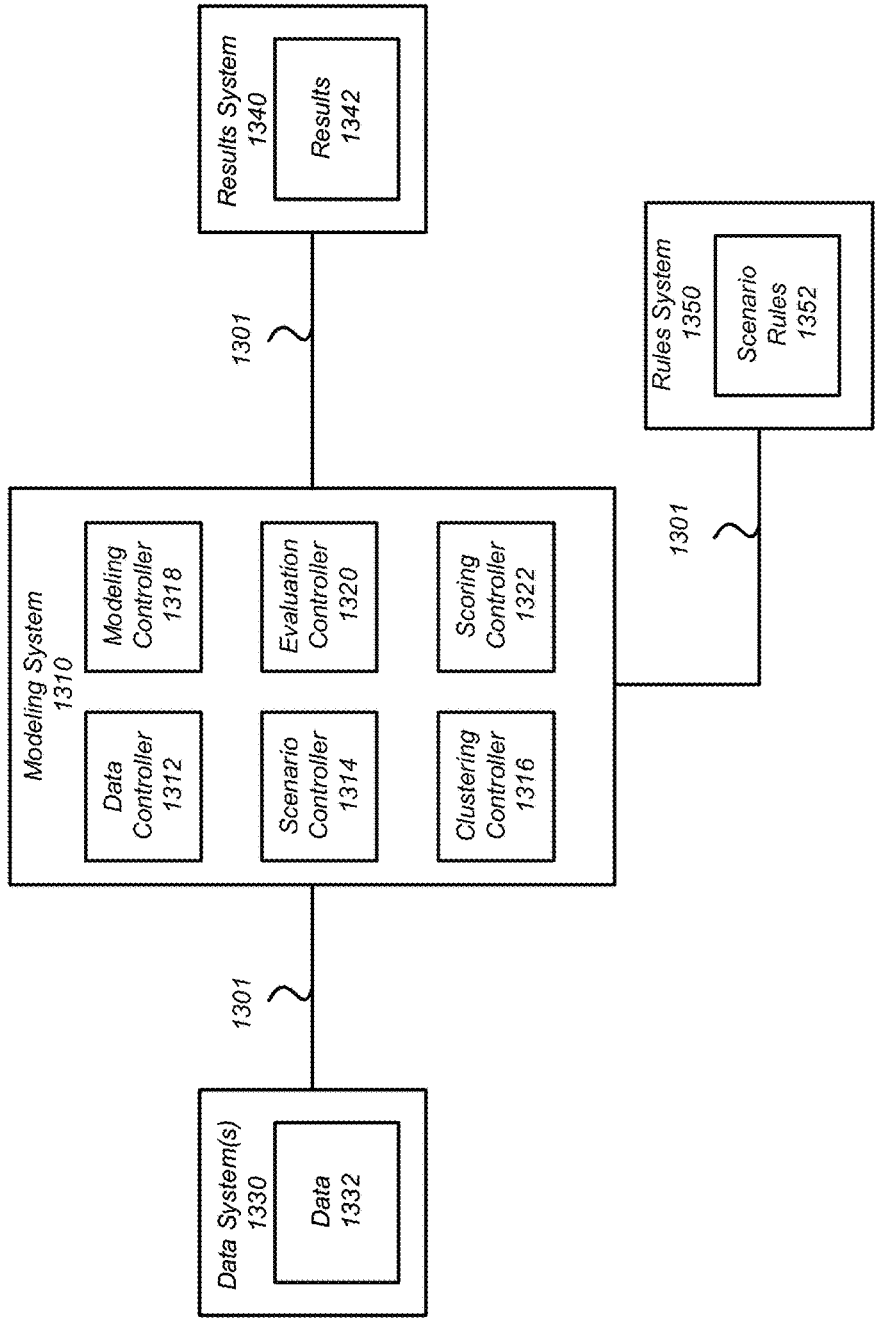

1400

1900

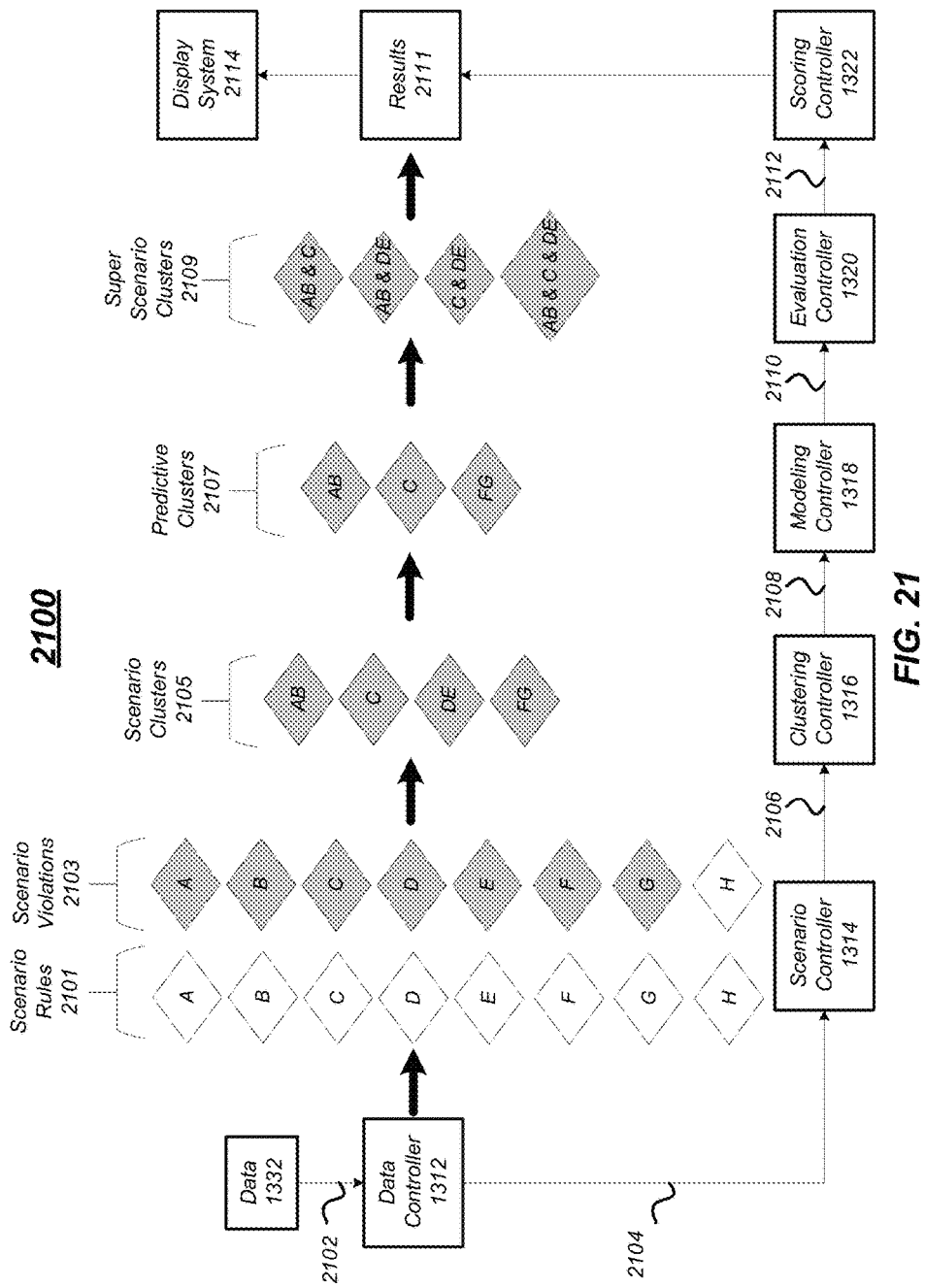

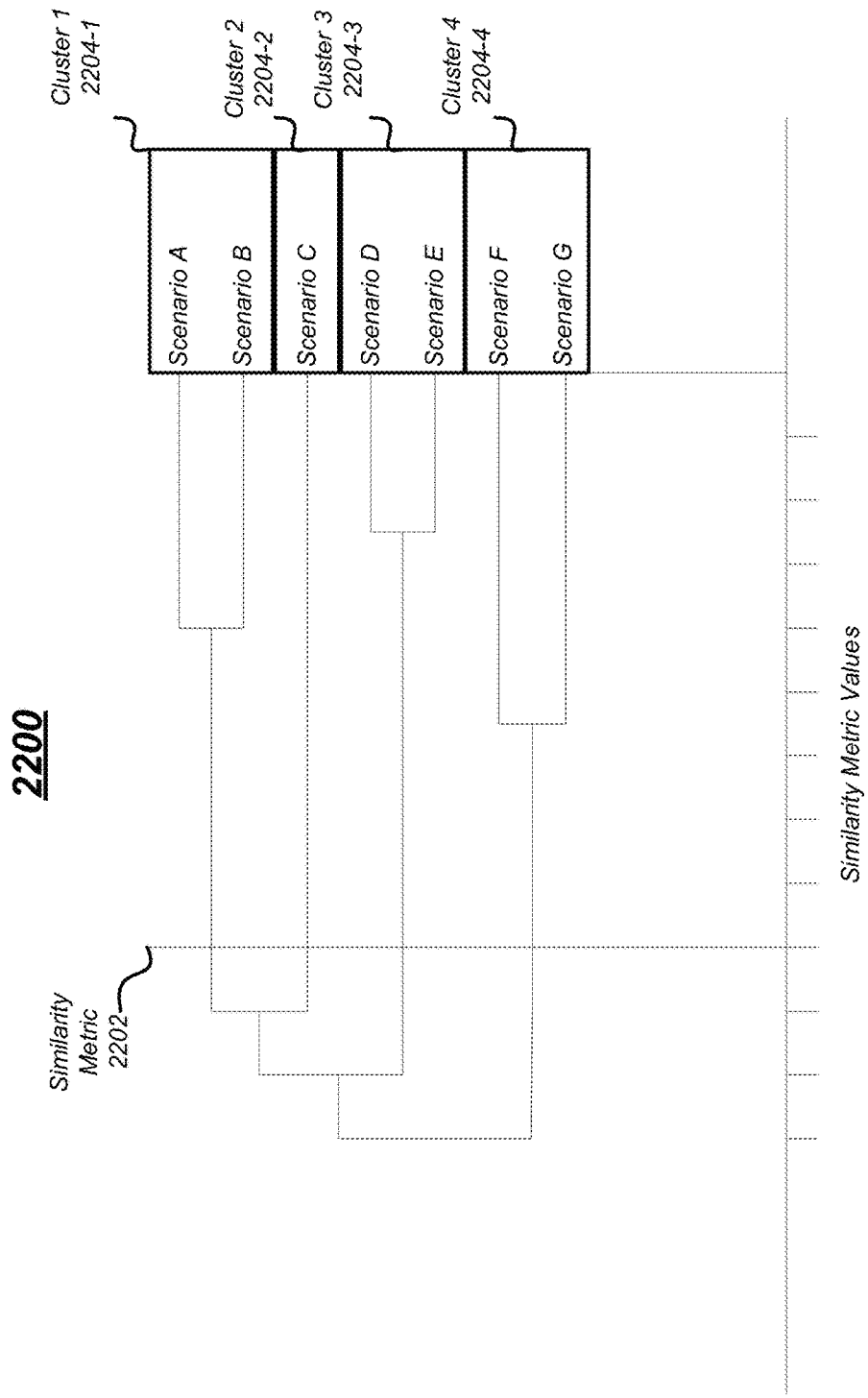

Table 2350

| | Name | Label | Nrules | Nsurrogates | Importance | imp_rank | Cluster ID |
|---|---|---|---|---|---|---|---|
| 1 | Cluster0004722016 0731 | | 1 | 0 | 1 | 1 | 0004722016 0731 |
| 2 | Cluster0005922016 0731 | | 1 | 0 | 0.999 | 2 | 0005922016 0731 |
| 3 | Cluster0010222016 0731 | | 0 | 4 | 0.928 | 3 | 0010222016 0731 |
| 4 | Cluster0018122016 0731 | | 1 | 0 | 0.842 | 4 | 0018122016 0731 |
| 5 | Cluster0007522016 0731 | | 0 | 1 | 0.829 | 5 | 0007522016 0731 |
| 6 | Cluster0003822016 0731 | | 3 | 0 | 0.79 | 6 | 0003822016 0731 |
| 7 | Cluster0013622016 0731 | | 0 | 4 | 0.769 | 7 | 0013622016 0731 |
| 8 | Cluster0014322016 0731 | | 1 | 1 | 0.62 | 8 | 0014322016 0731 |
| 9 | Cluster0013222016 0731 | | 0 | 3 | 0.716 | 9 | 0013222016 0731 |
| 10 | Cluster0017322016 0731 | | 1 | 0 | 0.713 | 10 | 0017322016 0731 |

FIG. 23B

COMPUTER SYSTEM TO IDENTIFY ANOMALIES BASED ON COMPUTER-GENERATED RESULTS

RELATED APPLICATION

This application claims the benefit of priority of 35 U.S.C. § 119(e) to U.S. Provisional Patent Application Ser. No. 62/461,065, filed on Feb. 21, 2017, which is incorporated by reference.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

Various embodiments described herein may include an apparatus comprising processing circuitry, and memory to store instructions that, when executed by the processing circuitry, cause the processing circuitry to obtain scenario rules and data representing actions performed by entities; apply the scenario rules to a subset of the data to detect scenario violations based on the actions performed by the entities, the subset of the data associated with the entities of a particular entity type; group scenario violations into scenario clusters, each scenario cluster comprising one or more scenario violations associated with similar behavior performed by the entities indicated by similarity metrics, and each of the scenario clusters is one of a set of scenario clusters; determine predictive ability values for each of the scenario clusters, the predictive ability values to indicate relative significance between each of the scenario clusters to predict a target behavior; rank the scenario clusters based on the predictive ability values and remove scenario clusters from the set of scenario clusters having predictive ability values below a predictive threshold; generate combinations of scenario clusters from the set of scenario clusters, each of the combinations of scenario clusters including two or more scenario clusters; determine an effectiveness factor for each of the combinations of scenario clusters, each of the effectiveness factors based on a number of entities committing the targeted behavior as a percentage of all the entities that committed at least one scenario violation for a particular combination of scenario clusters of the combinations of scenario clusters; generate scores for each of the entities of the particular entity type using the combinations of scenario clusters having the effectiveness factor at or above an effectiveness threshold; and provide results to a system to enable presentation on a display device, the results indicating one or more of the entities that committed the targeted behavior based on the scores for each of the entities.

In embodiments, the similarity metrics to indicate correlation distances for the scenario violations, the scenario violations having a similarity metric below an eigen value threshold are grouped into a same scenario cluster.

In embodiments, the processing circuitry to obtain the scenario rules and the data from one or more data system coupled via one or more network connections, and apply the scenario rules to the actions by comparing each indication of an action to each scenario rule to determine whether an entity committed a scenario violation, wherein the scenario rules define activity to detect the targeted behavior.

In embodiments, the processing circuitry to generate indicators for entities committing scenario violations based on applying the scenario rules, each indicator to indicate an entity committed a scenario violation.

In embodiments, the processing circuitry to pass each indicator for each of the scenario clusters through a statistical model to determine the predictive ability values for the scenario clusters, each indicator to indicate whether a scenario cluster is triggered to predict the targeted behavior, rank each of the scenario clusters based on the predictive ability values by relative significance, and remove scenario clusters having predictive ability values below the predictive threshold.

In embodiments, the processing circuitry to the processing circuitry to exhaustively generate the combinations of scenario clusters, each of the combinations comprising one or more scenario clusters.

In embodiments, the processing circuitry to determine one or more combinations of scenario clusters having overlapping scenario clusters, and to discard combinations of scenario clusters that are entirely overlapped by two or more other scenario clusters or entirely overlapped by another combination of scenario cluster.

In embodiments, the effectiveness threshold is a minimum number of scenario clusters required for a combination of scenario clusters, and the processing circuitry to determine a number of scenario clusters in each of the combinations of scenario clusters, and discard each of the combinations of scenario clusters having the number of scenario clusters below the minimum number of scenario clusters.

In embodiments, the effectiveness threshold is a minimum number of violating entities required for a combination of scenario clusters, and the processing circuitry to determine a number of violating entities for each of the combination of scenario clusters, and discard each of the combinations of scenario clusters having the number of violating entities below the minimum number of violating entities.

In embodiments, the processing circuitry to iteratively generate scores for every entity of every entity type, during each iteration the processing circuitry to determine another subset of the data associated with entities of another entity type; apply the scenario rules to the other subset of the data to determine new scenario violations for the entities of the other entity type; generate new scenario clusters by grouping the new scenario violations based on similarity metrics; rank the new scenario clusters based on predictive ability values for the new scenario clusters and remove scenario clusters from a set of new scenario clusters having predictive ability values below the predictive threshold; generate new combinations of scenario clusters, each new combination of scenario clusters to include one or more new scenario clusters; determine effectiveness factors the new combinations of scenario clusters, each of the effectiveness factors based on a number of entities of the other entity type committing the targeted behavior as a percentage of all the entities of the other entity type that committed at least one scenario violation for a particular combination of scenario clusters of the new combinations of scenario clusters; generate scores for each of the entities of the other entity type using the new combinations of scenario clusters having the effectiveness factor at or above an effectiveness threshold; and perform another iteration until scores are generated for every entity of every entity type.

Various embodiments may include A computer-implemented, including obtaining scenario rules and data representing actions performed by entities; applying the scenario rules to a subset of the data to detect scenario violations based on the actions performed by the entities, the subset of the data associated with the entities of a particular entity type; grouping scenario violations into scenario clusters, each scenario cluster comprising one or more scenario violations associated with similar behavior performed by the entities indicated by similarity metrics, and each of the scenario clusters is one of a set of scenario clusters; determining predictive ability values for each of the scenario clusters, the predictive ability values to indicate relative significance between each of the scenario clusters to predict a target behavior; ranking the scenario clusters based on the predictive ability values and removing scenario clusters from the set of scenario clusters having predictive ability values below a predictive threshold; generating combinations of scenario clusters from the set of scenario clusters, each of the combinations of scenario clusters including two or more scenario clusters; determining an effectiveness factor for each of the combinations of scenario clusters, each of the effectiveness factors based on a number of entities committing the targeted behavior as a percentage of all the entities that committed at least one scenario violation for a particular combination of scenario clusters of the combinations of scenario clusters; generating scores for each of the entities of the particular entity type using the combinations of scenario clusters having the effectiveness factor at or above an effectiveness threshold; and providing results to a system to enable presentation on a display device, the results indicating one or more of the entities that committed the targeted behavior based on the scores for each of the entities.

In embodiments, the method may include processing the similarity metrics to indicate correlation distances for the scenario violations, the scenario violations having a similarity metric below an eigen value threshold are grouped into a same scenario cluster.

In embodiments, the method may include obtaining the scenario rules and the data from one or more data system coupled via one or more network connections; and applying the scenario rules to the actions by comparing each indication of an action to each scenario rule to determine whether an entity committed a scenario violation, wherein the scenario rules define activity to detect the targeted behavior.

In embodiments, the method may include generating indicators for entities committing scenario violations based on applying the scenario rules, each indicator to indicate an entity committed a scenario violation.

In embodiments, the method may include passing each indicator for each of the scenario clusters through a statistical model to determine the predictive ability values for the scenario clusters, each indicator to indicate whether a scenario cluster is triggered to predict the targeted behavior, ranking each of the scenario clusters based on the predictive ability values by relative significance, and removing scenario clusters having predictive ability values below the predictive threshold.

In embodiments, the method may include exhaustively generating the combinations of scenario clusters, each of the combinations comprising one or more scenario clusters.

In embodiments, the method may include determining one or more combinations of scenario clusters having overlapping scenario clusters, and to discard combinations of scenario clusters that are entirely overlapped by two or more other scenario clusters or entirely overlapped by another combination of scenario cluster.

In embodiments, the method may include determining a number of scenario clusters in each of the combinations of scenario clusters, and discarding each of the combinations of scenario clusters having the number of scenario clusters below a minimum number of scenario clusters, wherein the effectiveness threshold is the minimum number of scenario clusters required for a combination of scenario clusters.

In embodiments, the method may include determining a number of violating entities for each of the combination of scenario clusters, and discarding each of the combinations of scenario clusters having the number of violating entities below a minimum number of violating entities, wherein the effectiveness threshold is the minimum number of violating entities required for a combination of scenario clusters.

In embodiments, the method may include determining another subset of the data associated with entities of another entity type; applying the scenario rules to the other subset of the data to determine new scenario violations for the entities of the other entity type; generating new scenario clusters by grouping the new scenario violations based on similarity metrics; ranking the new scenario clusters based on predictive ability values for the new scenario clusters and remove scenario clusters from a set of new scenario clusters having predictive ability values below the predictive threshold; generating new combinations of scenario clusters, each new combination of scenario clusters to include one or more new scenario clusters; determining effectiveness factors the new combinations of scenario clusters, each of the effectiveness factors based on a number of entities of the other entity type committing the targeted behavior as a percentage of all the entities of the other entity type that committed at least one scenario violation for a particular combination of scenario clusters of the new combinations of scenario clusters; generating scores for each of the entities of the other entity type using the new combinations of scenario clusters having the effectiveness factor at or above an effectiveness threshold; and performing another iteration until scores are generated for every entity of every entity type.

Various embodiments may also include at least one non-transitory computer-readable storage medium comprising instructions that when executed cause processing circuitry to obtain scenario rules and data representing actions performed by entities; apply the scenario rules to a subset of the data to detect scenario violations based on the actions performed by the entities, the subset of the data associated with the entities of a particular entity type; group scenario violations into scenario clusters, each scenario cluster comprising one or more scenario violations associated with similar behavior performed by the entities indicated by similarity metrics, and each of the scenario clusters is one of a set of scenario clusters; determine predictive ability values for each of the scenario clusters, the predictive ability values to indicate relative significance between each of the scenario clusters to predict a target behavior; rank the scenario clusters based on the predictive ability values and removing scenario clusters from the set of scenario clusters having predictive ability values below a predictive threshold; generate combinations of scenario clusters from the set of scenario clusters, each of the combinations of scenario clusters including two or more scenario clusters; determine an effectiveness factor for each of the combinations of scenario clusters, each of the effectiveness factors based on a number of entities committing the targeted behavior as a percentage of all the entities that committed at least one scenario violation for a particular combination of scenario clusters of the combinations of scenario clusters; generate scores for each of the entities of the particular entity type using the combinations of scenario clusters having the effectiveness factor at or above an effectiveness threshold; and provide results to a system to enable presentation on a display device, the results indicating one or more of the entities that committed the targeted behavior based on the scores for each of the entities.

In embodiments, the at least one non-transitory computer-readable storage medium comprising instructions that when executed cause processing circuitry to process the similarity metrics to indicate correlation distances for the scenario violations, the scenario violations having a similarity metric below an eigen value threshold are grouped into a same scenario cluster.

In embodiments, the at least one non-transitory computer-readable storage medium comprising instructions that when executed cause processing circuitry to obtain the scenario rules and the data from one or more data system coupled via one or more network connections; and apply the scenario rules to the actions by comparing each indication of an action to each scenario rule to determine whether an entity committed a scenario violation, wherein the scenario rules define activity to detect the targeted behavior.

In embodiments, the at least one non-transitory computer-readable storage medium comprising instructions that when executed cause processing circuitry to generate indicators for entities committing scenario violations based on applying the scenario rules, each indicator to indicate an entity committed a scenario violation.

In embodiments, the at least one non-transitory computer-readable storage medium comprising instructions that when executed cause processing circuitry to pass each indicator for each of the scenario clusters through a statistical model to determine the predictive ability values for the scenario clusters, each indicator to indicate whether a scenario cluster is triggered to predict the targeted behavior, rank each of the scenario clusters based on the predictive ability values by relative significance, and remove scenario clusters having predictive ability values below the predictive threshold.

In embodiments, the at least one non-transitory computer-readable storage medium comprising instructions that when executed cause processing circuitry to exhaustively generate the combinations of scenario clusters, each of the combinations comprising one or more scenario clusters.

In embodiments, the at least one non-transitory computer-readable storage medium comprising instructions that when executed cause processing circuitry to determine one or more combinations of scenario clusters having overlapping scenario clusters, and to discard combinations of scenario clusters that are entirely overlapped by two or more other scenario clusters or entirely overlapped by another combination of scenario cluster.

In embodiments, the at least one non-transitory computer-readable storage medium comprising instructions that when executed cause processing circuitry to determine a number of scenario clusters in each of the combinations of scenario clusters, and discarding each of the combinations of scenario clusters having the number of scenario clusters below a minimum number of scenario clusters, wherein the effectiveness threshold is the minimum number of scenario clusters required for a combination of scenario clusters.

In embodiments, the at least one non-transitory computer-readable storage medium comprising instructions that when executed cause processing circuitry to determine a number of violating entities for each of the combination of scenario clusters, and discarding each of the combinations of scenario clusters having the number of violating entities below a minimum number of violating entities, wherein the effectiveness threshold is the minimum number of violating entities required for a combination of scenario clusters.

In embodiments, the at least one non-transitory computer-readable storage medium comprising instructions that when executed cause processing circuitry to iteratively process every entity of entity type to include determine another subset of the data associated with entities of another entity type; apply the scenario rules to the other subset of the data to determine new scenario violations for the entities of the other entity type; generate new scenario clusters by grouping the new scenario violations based on similarity metrics; rank the new scenario clusters based on predictive ability values for the new scenario clusters and remove scenario clusters from a set of new scenario clusters having predictive ability values below the predictive threshold; generate new combinations of scenario clusters, each new combination of scenario clusters to include one or more new scenario clusters; determine effectiveness factors the new combinations of scenario clusters, each of the effectiveness factors based on a number of entities of the other entity type committing the targeted behavior as a percentage of all the entities of the other entity type that committed at least one scenario violation for a particular combination of scenario clusters of the new combinations of scenario clusters; generate scores for each of the entities of the other entity type using the new combinations of scenario clusters having the effectiveness factor at or above an effectiveness threshold; and perform another iteration until scores are generated for every entity of every entity type.

BRIEF DESCRIPTION OF THE DRAWINGS

Embodiments of this disclosure are illustrated by way of example and not by way of limitation, in the figures of the accompanying drawings in which like reference numerals refer to similar elements.

FIG. 21 illustrates an example processing flow to process data, generate super scenario clusters, and score entities.

FIG. 22 illustrates an example of a graph for clustering scenarios based on a similarity metric.

FIG. 23B illustrates an example table illustrating rankings of clusters based on predictive ability.

DETAILED DESCRIPTION

Figure 1:
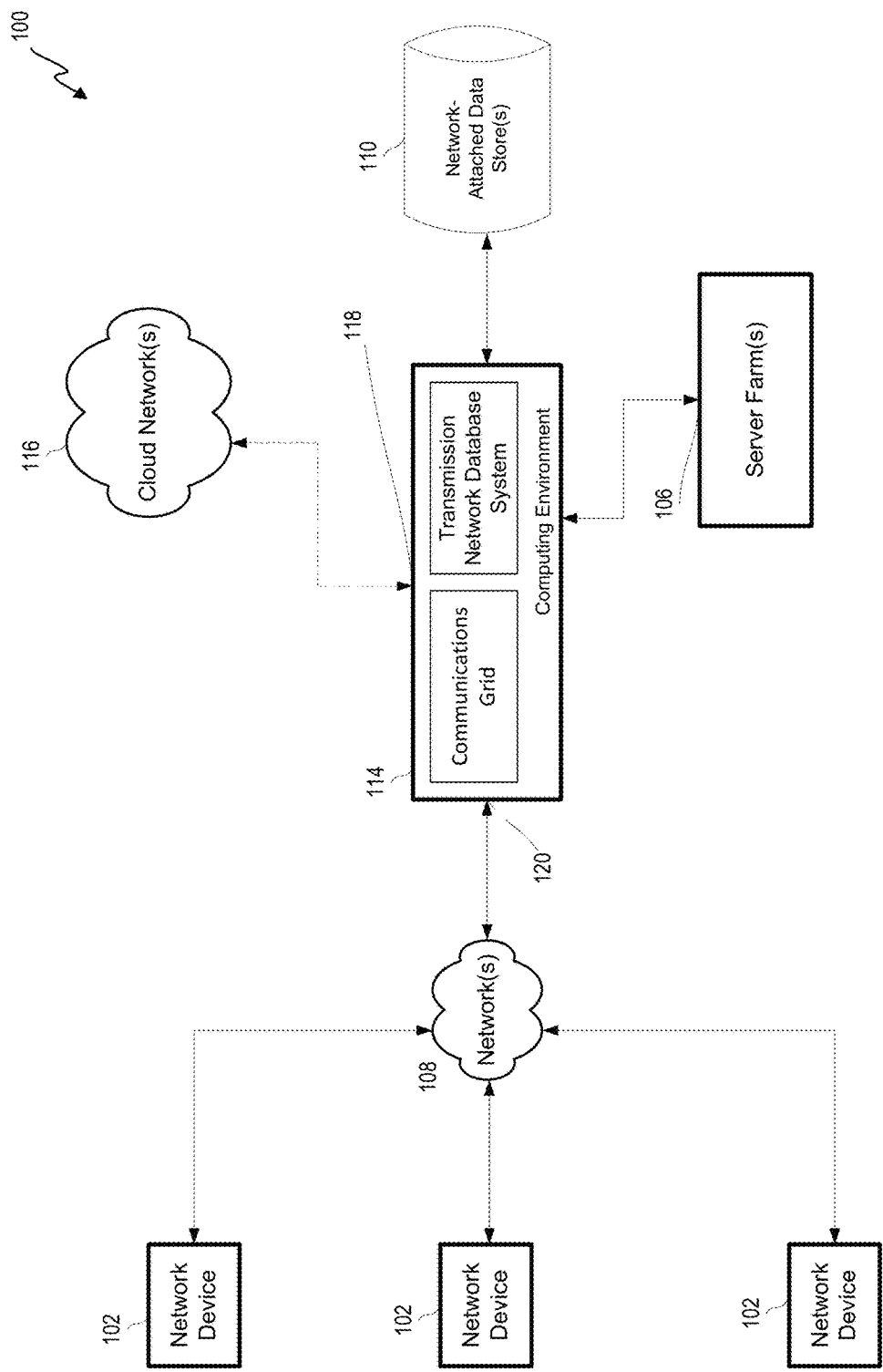
FIG. 1 illustrates a block diagram that illustrates the hardware components of a computing system, according to some embodiments of the present technology.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
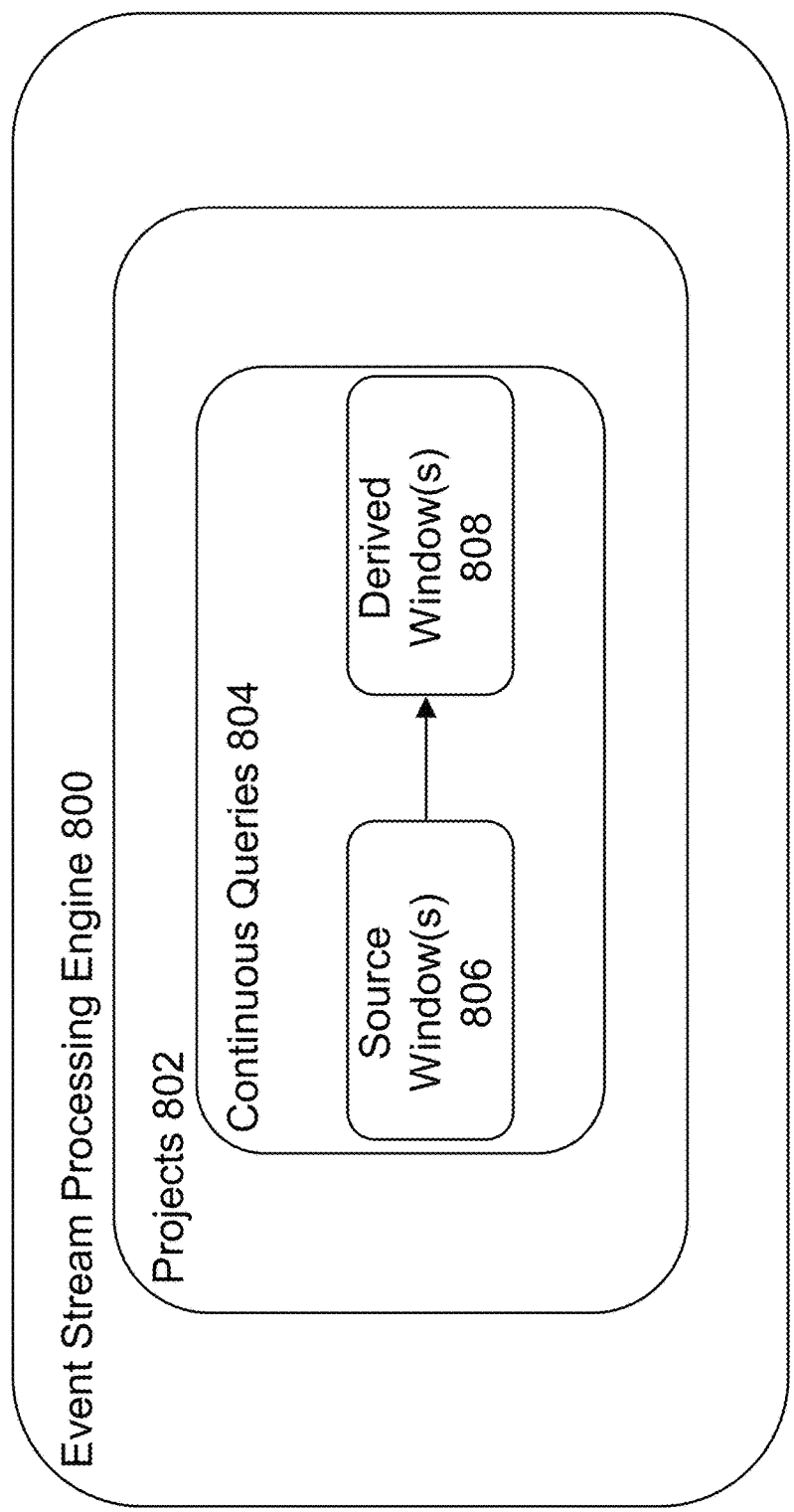
FIG. 8 illustrates a block diagram including components of an Event Stream Processing Engine (ESPE), according to embodiments of the present technology.
Figure 9:
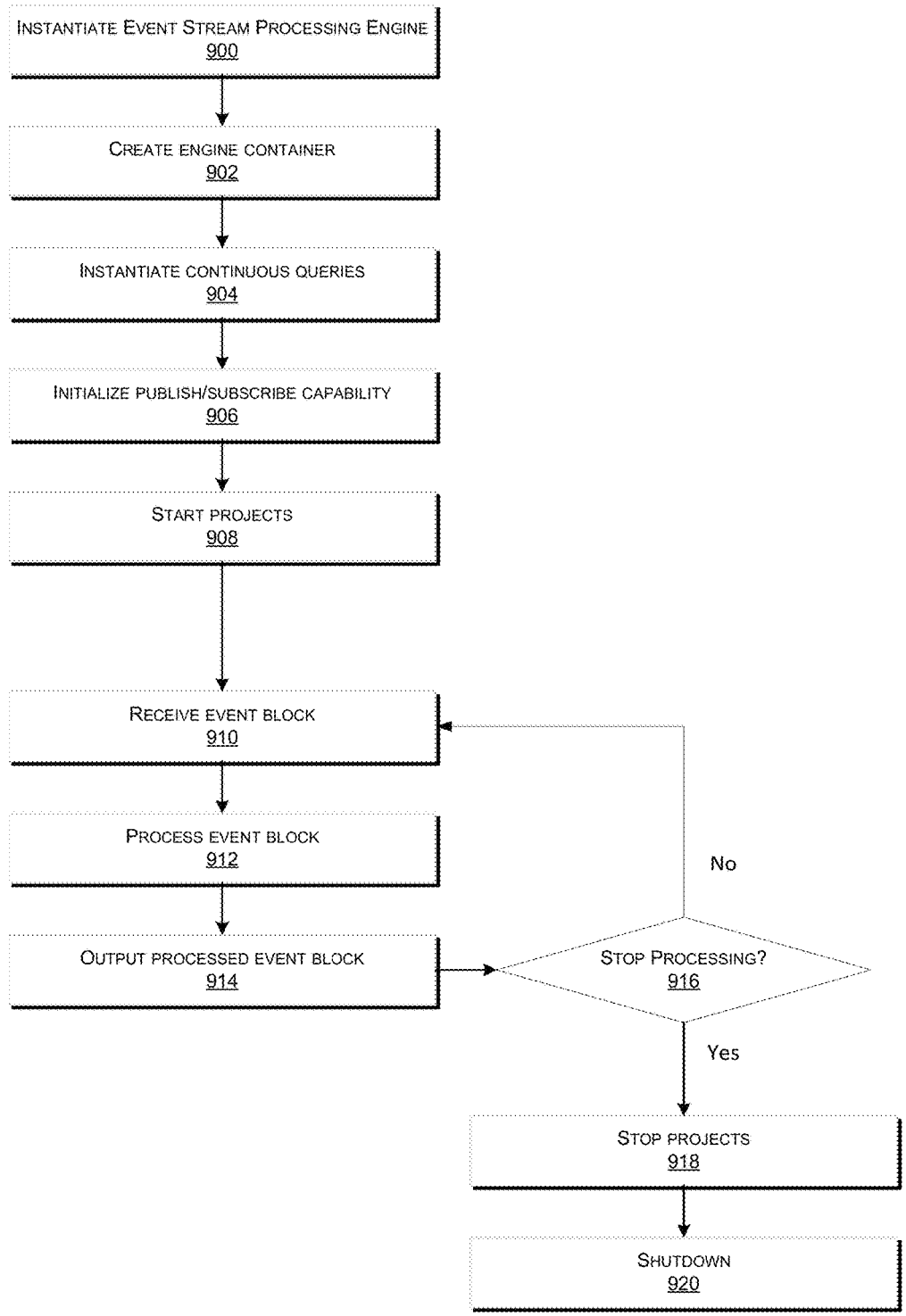
FIG. 9 illustrates a flow chart showing an example process including operations performed by an event stream processing engine, according to some embodiments of the present technology.
Figure 10:
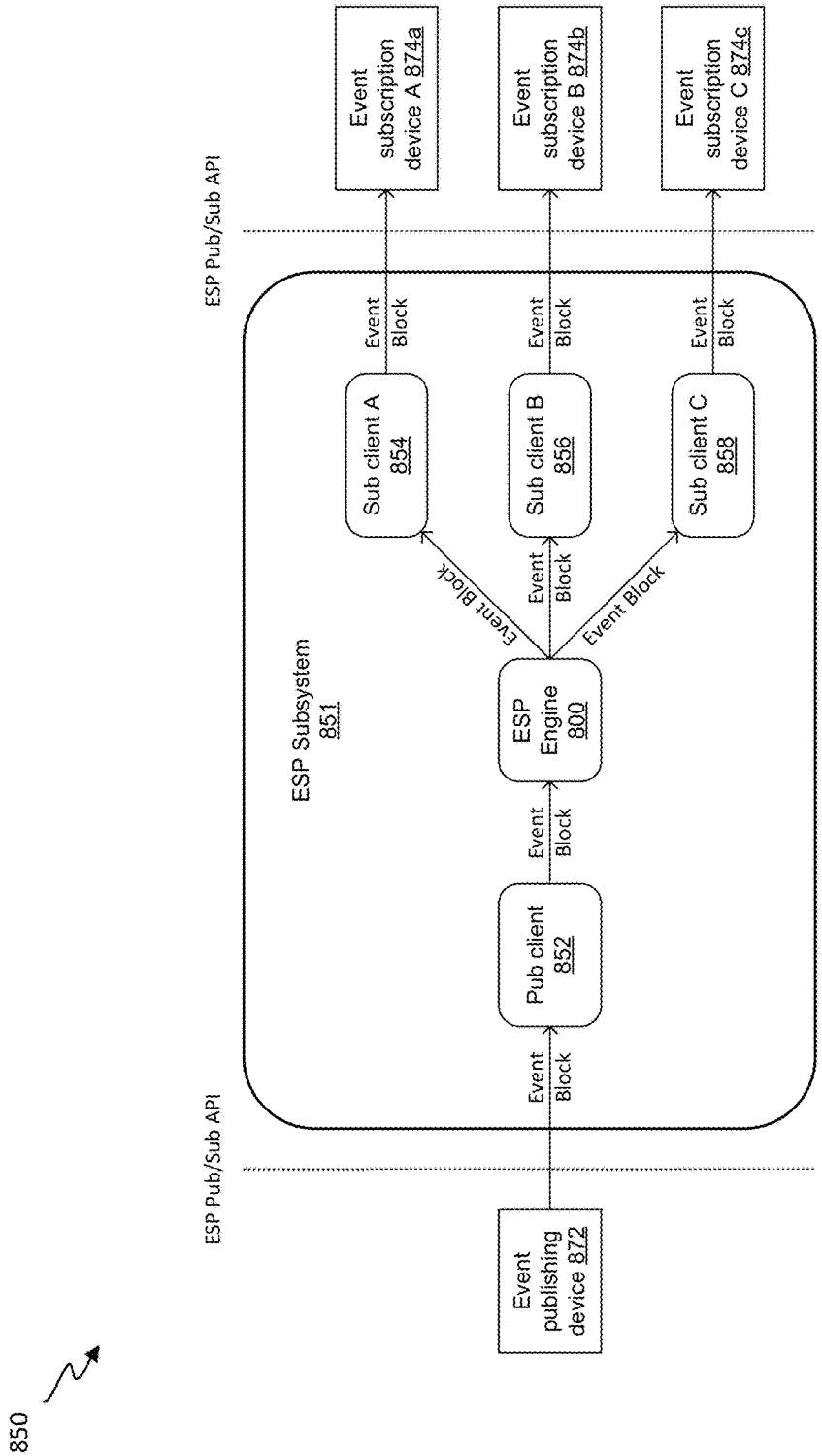
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
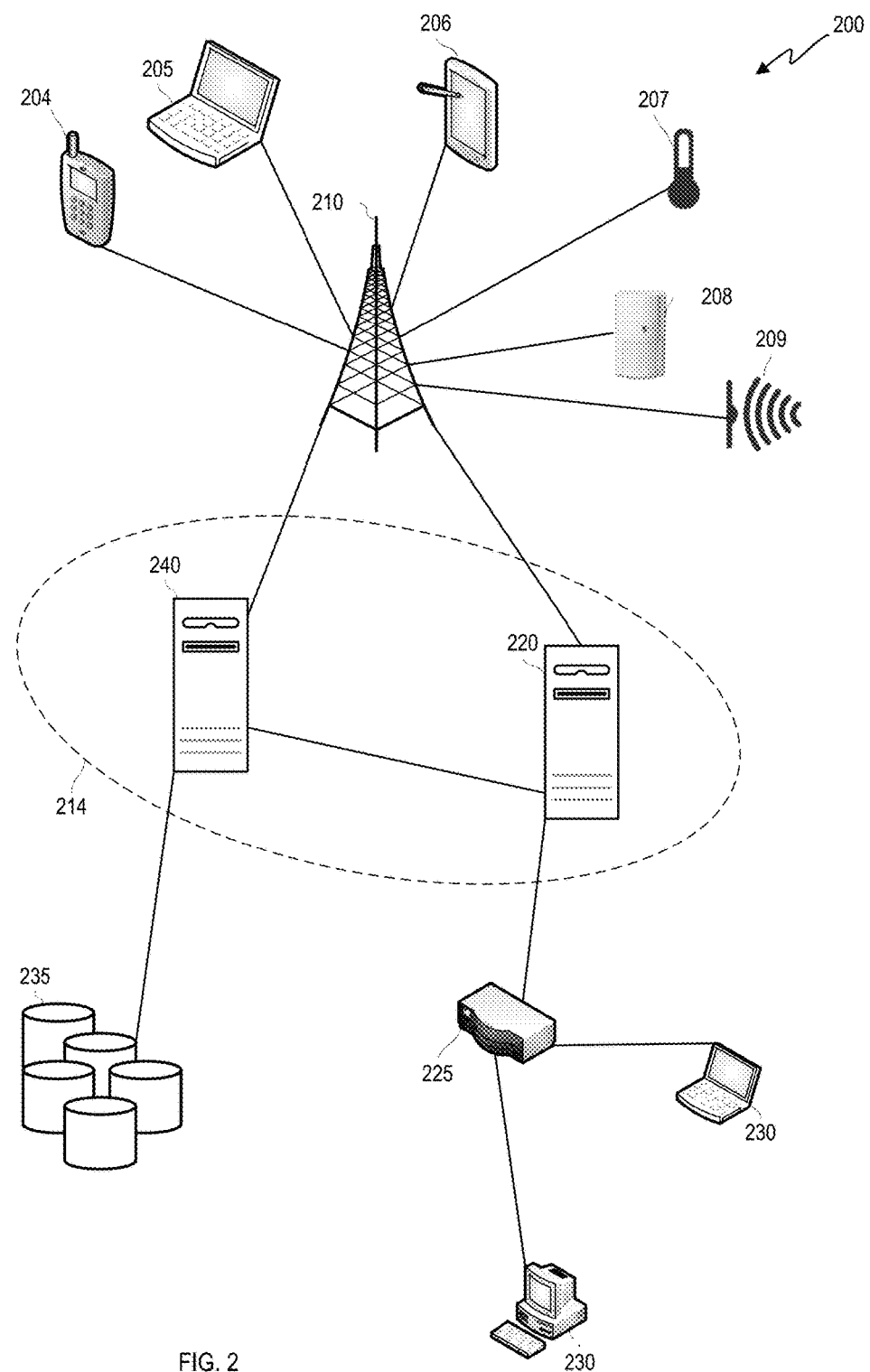
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240, such as a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments.

Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
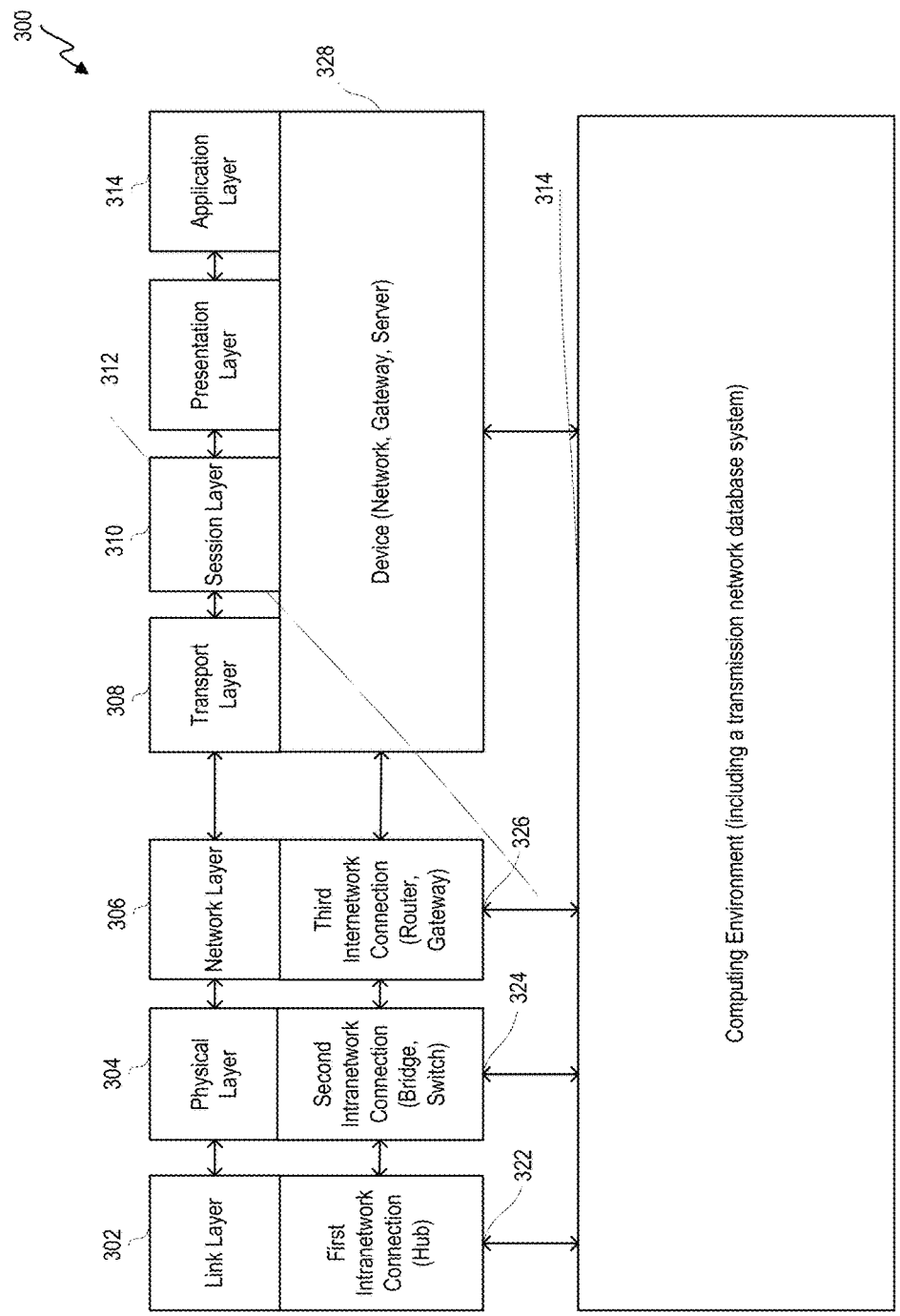
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 316 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer 314, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer 314 is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 316 can interact with and/or operate on, in various embodiments, one, more, all or any of the various layers. For example, computing environment 316 can interact with a hub (e.g., via the link layer) so as to adjust which devices the hub communicates with. The physical layer may be served by the link layer, so it may implement such data from the link layer. For example, the computing environment 316 may control which devices it will receive data from. For example, if the computing environment 316 knows that a certain network device has turned off, broken, or otherwise become unavailable or unreliable, the computing environment 316 may instruct the hub to prevent any data from being transmitted to the computing environment 316 from that network device. Such a process may be beneficial to avoid receiving data that is inaccurate or that has been influenced by an uncontrolled environment. As another example, computing environment 316 can communicate with a bridge, switch, router or gateway and influence which device within the system (e.g., system 200) the component selects as a destination. In some embodiments, computing environment 316 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 316 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
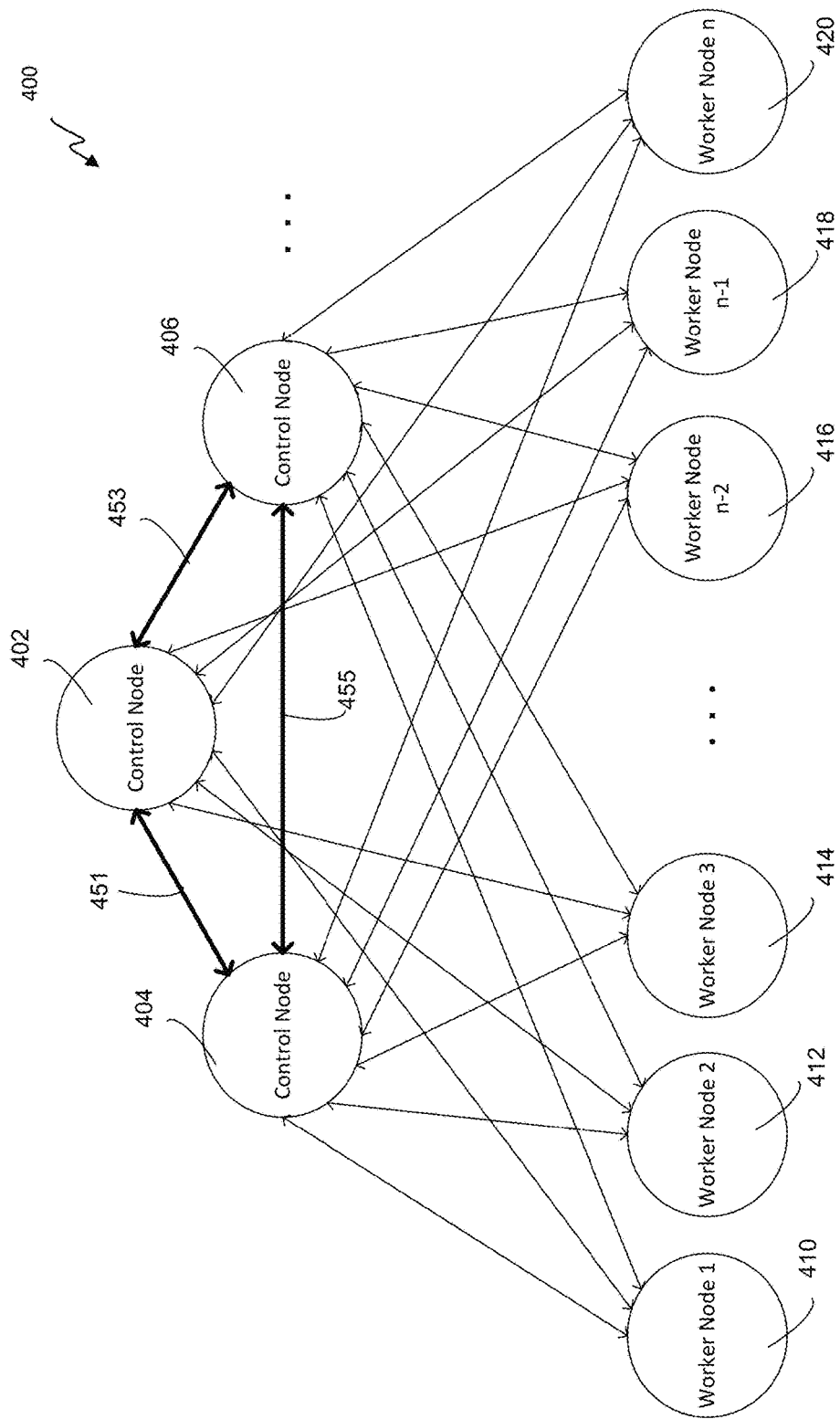
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
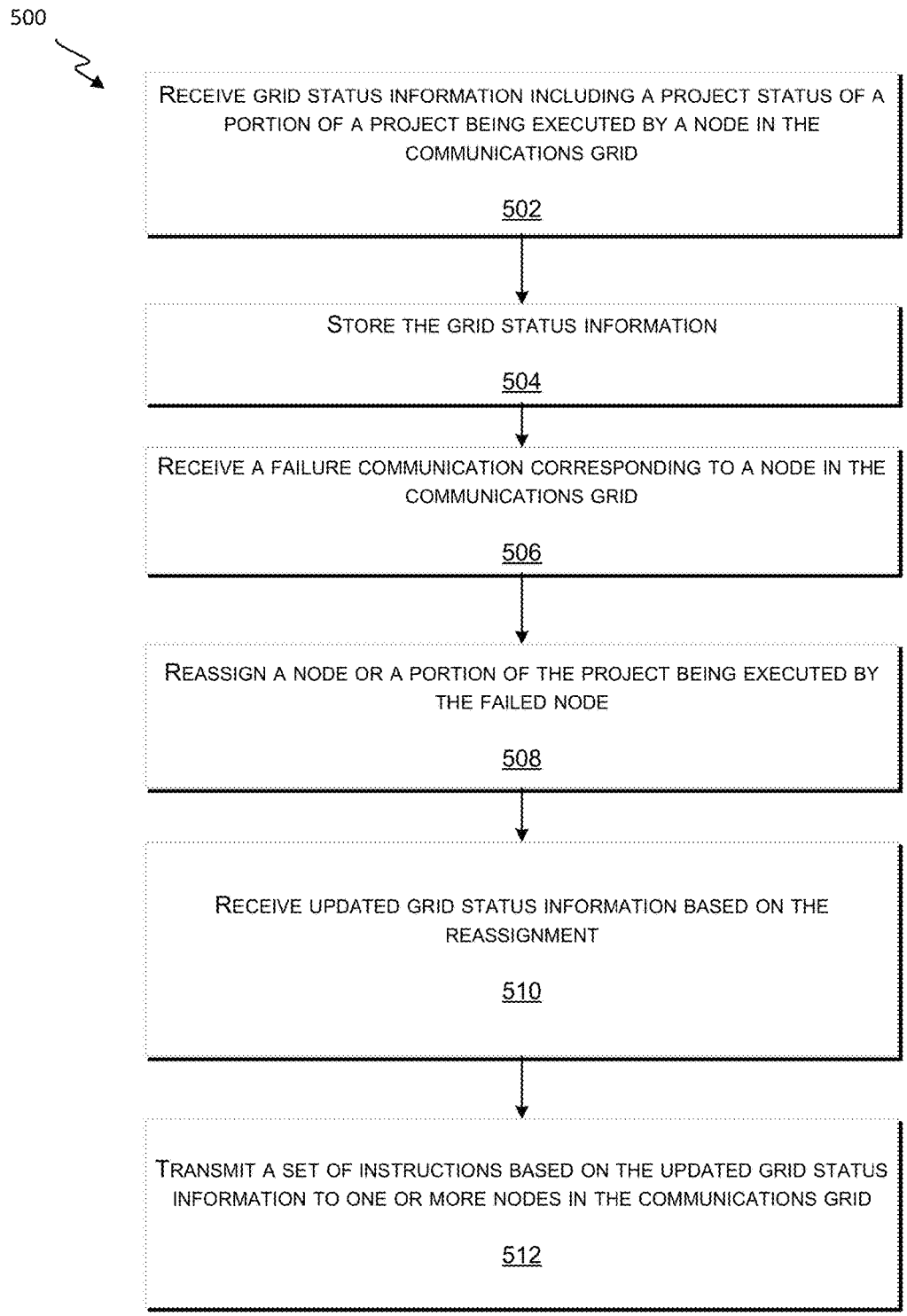
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
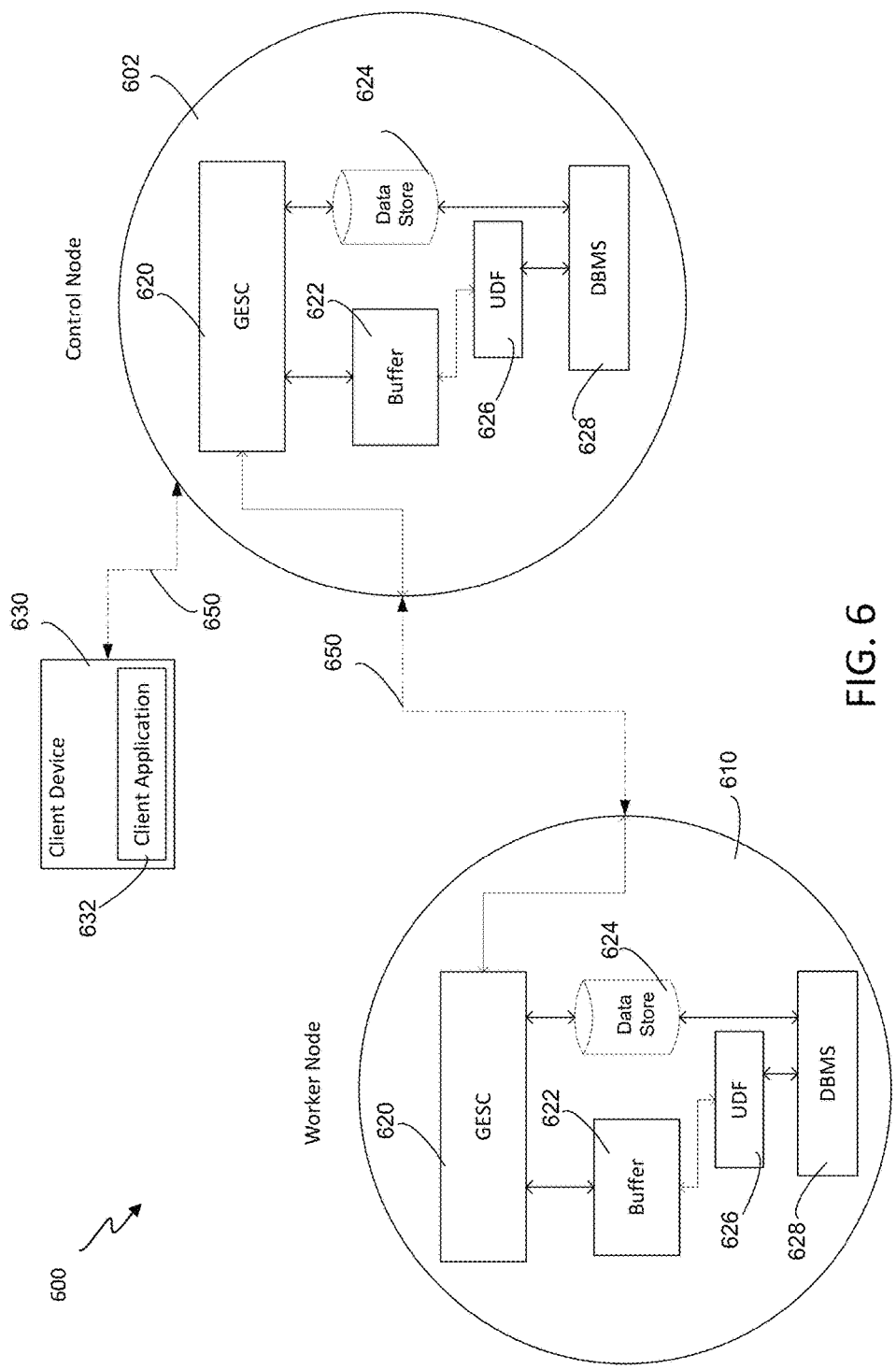
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
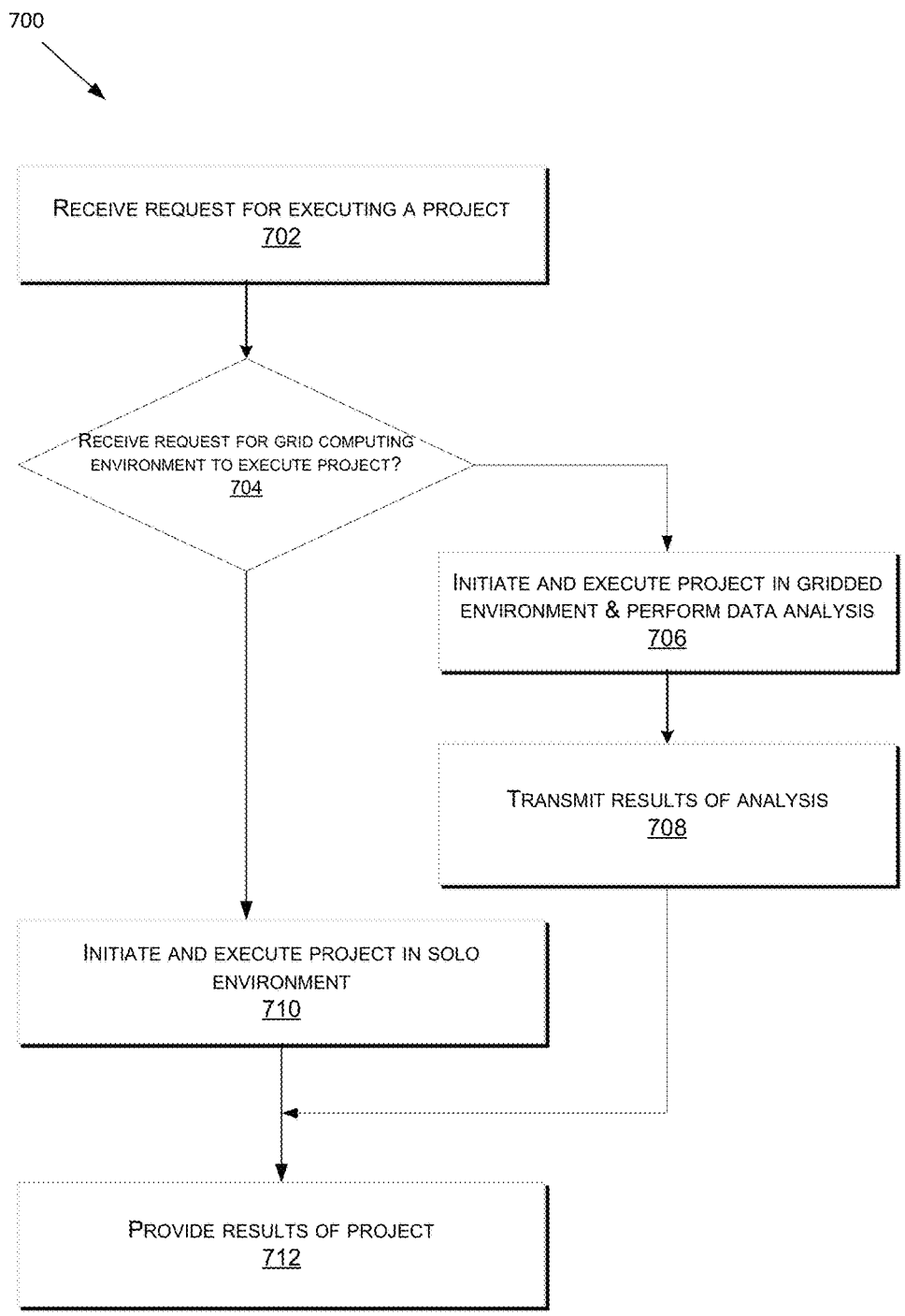
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874a-c, according to embodiments of the present technology. ESP system 850 may include ESP device or subsystem 851, event publishing device 872, an event subscribing device A 874a, an event subscribing device B 874b, and an event subscribing device C 874c. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874a, event subscribing device B 874b, and event subscribing device C 874c. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874a, event subscribing device B 874b, and event subscribing device C 874c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874a, event subscribing device B 874b, and event subscribing device C 874c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874a using the publish/subscribe API. Subscribing client B 856 may be started by an event subscription application B executing at event subscribing device B 874b using the publish/subscribe API. Subscribing client C 858 may be started by an event subscription application C executing at event subscribing device C 874c using the publish/subscribe API.

An event block object containing one or more event objects is injected into a source window of the one or more source windows 806 from an instance of an event publishing application on event publishing device 872. The event block object may generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874a, event subscription device B 874b, and event subscription device C 874c. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874a-c. For example, subscribing client A 804, subscribing client B 806, and subscribing client C 808 may send the received event block object to event subscription device A 874a, event subscription device B 874b, and event subscription device C 874c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
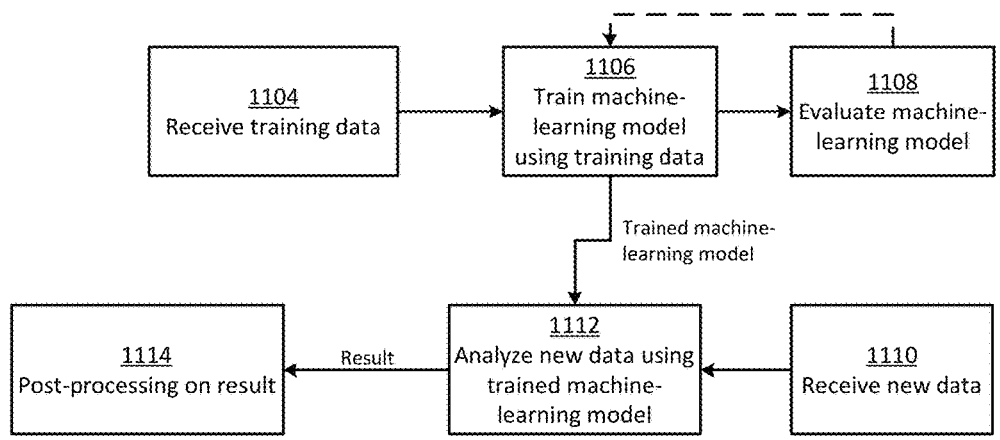
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
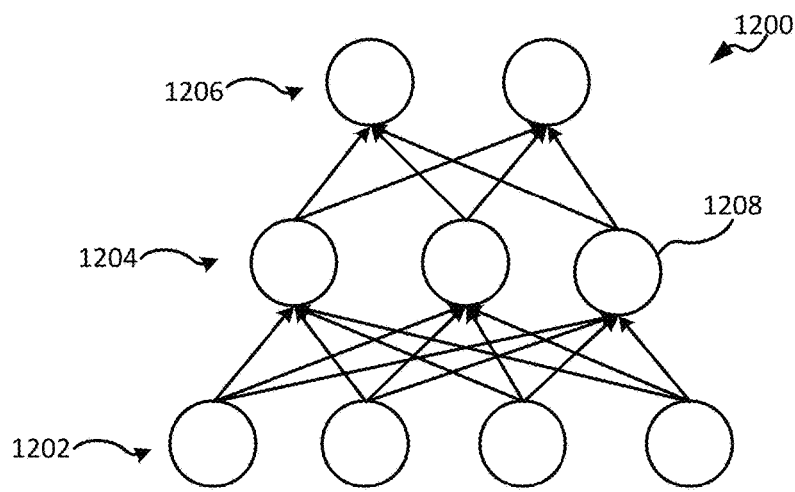
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements one or more neural networks using semiconductor (e.g., silicon (Si), gallium arsenide (GaAs)) devices. These processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

According to embodiments discussed herein, the above-described systems may be utilized to process data including actions that break scenario rules, e.g. rules that may be generated to detect targeted behavior. A scenario rule is broken when an entity of interest has committed a scenario violation. All of these scenario violations are then evaluated to produce a ranked score for the entity indicating their likelihood of engaging in specific type of behavior. Useful as this method is, it suffers from the inability to consider more complex behaviors which may be significantly more indicative of the targeted behavior. For instance, there are situations where behavior associated with Scenario A may be innocuous when considered in isolation and, similarly, behavior associated with Scenario B may also be innocuous when considered in isolation but the simultaneous violation of both Scenario A & Scenario B in tandem is strongly indicative of the targeted behavior. This is of particular interest when the combined effect of violating both scenarios increases the likelihood of the behavior in a non-additive manner, that is, the whole of the evidence proves to be greater than the sum of its parts.

Thus, embodiments are directed towards grouping scenario violations to more accurately detect targeted behaviors. In embodiments, systems discussed herein may cluster the scenario violations in order to group scenarios indicative of similar behavior together as determined by some similarity threshold. The grouped scenarios form scenario clusters, for example. Thus, in order for an entity to trigger a cluster they only need to violate one of the scenarios that compose the cluster. The system may also feed the scenario clusters into a statistical model in order to rank the predictive ability of each scenario cluster when considered in isolation relative to other scenario violations perpetrated by an entity. Scenario clusters which do not exhibit an acceptable degree of predictive capability are screened out in order to reduce the number of clusters to be evaluated. The effectiveness of each combination of scenario clusters is iteratively computed across all possible combinations of scenario clusters. Moreover, combinations of scenario clusters which are determined to be both adequately predictive and distinct are then retained to create the resulting super scenarios. Super scenario violations are then scored to produce an overall entity score which may be used to detect targeted behavior.

Figure 13A:
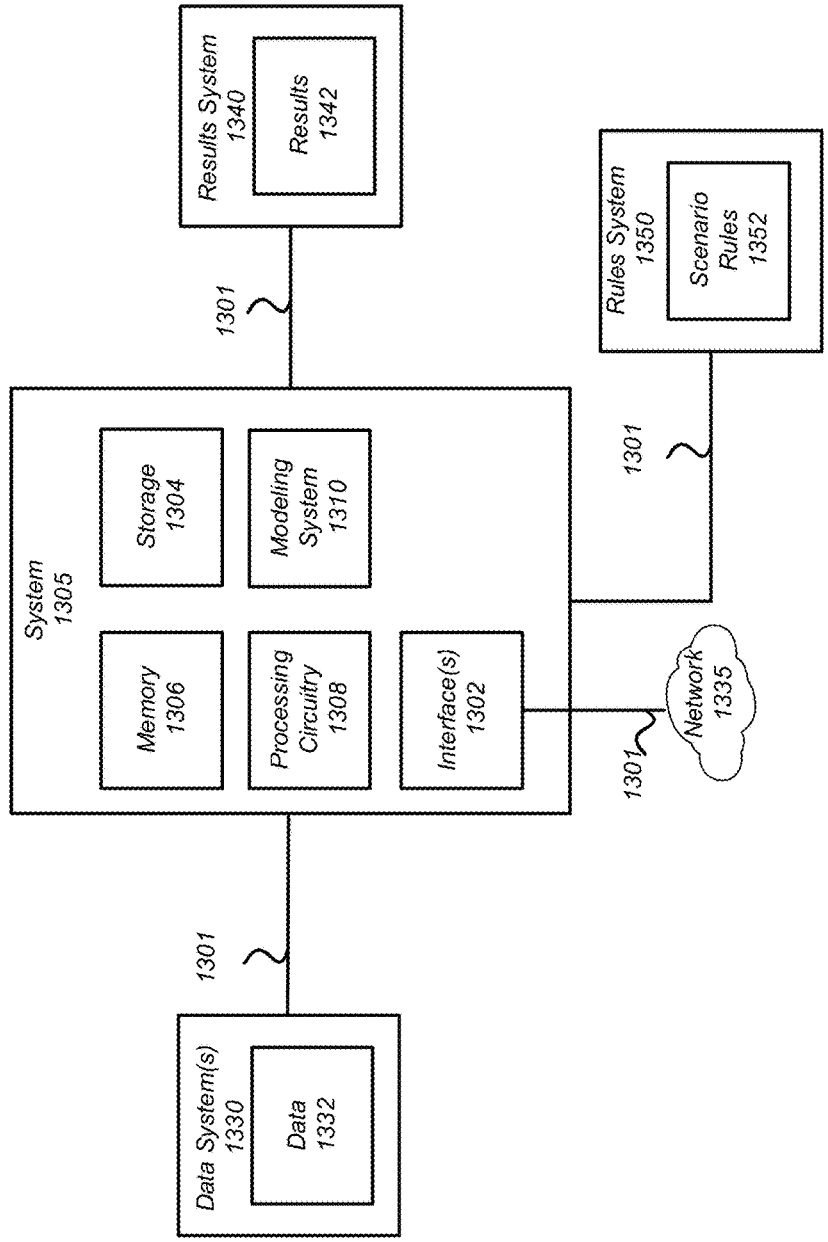
FIGS. 13A/13B illustrate examples of a distributed processing system.

FIGS. 13A/13B illustrate examples of a distributed processing system environment 1300 to process data and apply one or more scenario rules to detect one or more scenario violations. The one or more scenario violations are clustered, analyzed to determine predictive ability, and grouped further into super scenario clusters. A super scenario cluster is a cluster (or combination) of scenario clusters, whereas a scenario cluster can be a combination of individual scenarios. The super scenario clusters can be used to score an entity to detect anomalies or targeted behavior. For example, systems discussed herein may be utilized in a cybersecurity application to detect computer attacks based on one or more detected actions breaking one or more scenario rules. The scenario rules may specify actions typically associated with behavior conducted when an attack is performed. In another tangible, real-world example, systems discussed herein may be used to detect fraud performed by healthcare entities based on one or more detected actions breaking one or more scenario rules specifying action typically performed when fraud is being committed. In some instances, the combination of rules violated may be more indicative of a security violation or fraud behavior than a single rule being broken, as will be discussed in more detail below. In embodiments, these operations may be performed in real-time or near real-time by the computing system environment 1300. Further, the illustrated computing system environment 1300 includes a number of systems, components, devices, and so forth to perform these operations; however, embodiments are not limited in the manner. In some embodiments, the computing system environment 1300 may include more or fewer systems, components, and devices, for example.

In some embodiments, the computing system environment 1300 may include a system 1305 having a number of components and is coupled with other systems, including a data system 1330, a results system 1340, and a rules system 1350. Each of the systems 1330, 1340, and 1350 may include a number of processing and networking elements and may be coupled with system 1305 via one or more wired and/or wireless links 1301. Further, the systems 1330, 1340, and 1350 may include any number of storage devices to store information and data, such as data 1332, results 1342, and scenario rules 1352. The scenario rules 1352 include one or more scenarios, that when detected as occurring by the system 1305 cause the system 1305 to take one or more actions, such as indicating a scenario violation. The information and data can be stored in any type of data structure, such as databases, lists, arrays, trees, hashes, files, and so forth. Further, the one or more of the systems 1330, 1340, and 1350 can include a Network-attached storage (NAS), Direct-attached storage (DAS), a Storage area network (SAN), include storage devices, such as magnetic storage devices and optical storage devices. The storage may also include volatile and non-volatile storage. Embodiments are not limited in this manner.

System 1305 also includes a number components, including, but not limited to, storage 1304, memory 1306, processing circuitry 1308, and one or more interfaces 1302. The system 1305 may be coupled with one or more other systems, components, devices, networks, and so forth through network environment 1335.

Storage 1304 may be any type of storage, including, but not limited to, magnetic storage and optical storage, for example. The storage 1304 may store information and data for system 1305, such as information for processing by the system 1305. In embodiments, the storage 1304 may store information, data, one or more instructions, code, and so forth for the modeling system 1310. Embodiments are not limited in this manner.

The memory 1306 of system 1305 can be implemented using any machine-readable or computer-readable media capable of storing data, including both volatile and non-volatile memory. In some embodiments, the machine-readable or computer-readable medium may include a non-transitory medium. The embodiments are not limited in this context. The memory 1306 can store data momentarily, temporarily, or permanently. The memory 1306 stores instructions and data for system 1305, which may be processed by processing circuitry 1308. For example, the memory 1306 may also store temporary variables or other intermediate information while the processing circuitry 1316 is executing instructions. The memory 1306 is not limited to storing the above-discussed data; the memory 1306 may store any type of data.

In embodiments, the system 1305 may include processing circuitry 1308 which may include one or more of any type of computational element, such as but not limited to, a microprocessor, a processor, central processing unit, digital signal processing unit, dual-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, a graphical processing unit (GPU), an application-specific integrated circuit (ASIC), a field programmable gate array (FPGA), an artificial intelligence (AI) accelerator, a neural computing core, a neural computing engine, a neural processing unit, a purpose-built chip architecture for deep learning, a machine-learning specific processor that implements a machine learning approach or one or more neural networks using semiconductor (e.g., silicon (Si), gallium arsenide (GaAs)) devices, or other types of processing circuitry or integrated circuits. The processing circuitry 1316 may be connected to and communicate with the other elements of the system 1305 including the modeling system 1310, the storage 1304, the memory 1306, and the one or more interfaces 1302.

The system 1305 may also include one or more interfaces 1302 which may enable the system to communicate over the network environment 1335. In some embodiments, the interfaces 1302 can be a network interface, a universal serial bus interface (USB), a Firewire interface, a Small Computer System Interface (SCSI), a parallel port interface, a serial port interface, or any other device to enable the system 1305 to exchange information.

The system 1305 may also include a modeling system 1310 to process data to detect anomalies, such as computer security violations or healthcare fraud. The modeling system 1310 may obtain data associated with one or more entities and process the data to determine whether any of the entities conducted behavior to indicate a security violation or fraud, for example. The modeling system 1310 may perform anomaly detection by clustering scenario violations that are indicative of similar behavior. The scenario violations are detected by the system 1305 by applying the scenario rules 1352 to data 1332, which includes actions and conducted behavior performed by an entity. The clusters may be individually analyzed to determine whether the clusters exhibit an ability to predict a target outcome of interest. Clusters that exhibit a sufficient ability to predict a target outcome are selected, and these individually predictive scenario clusters are then exhaustively evaluated to determine the predictive capability of every possible combination of the selected scenario clusters. An individually predictive scenario cluster refers to a cluster (grouping) of scenario violations which may be associated with an increased likelihood of some target outcome. Put another way, the presence of particular action or condition may be statistically significantly associated with an increased likelihood of the outcome of interest when evaluated in isolation (as opposed to being evaluated in combination with all other scenario/cluster violations).

The modeling system 1310 may utilize the predictive capability of every possible combination to identify optimal super scenario clusters. Super scenario clusters are a combination of scenario clusters. Scenario clusters are a combination of individual scenarios. Breaking a scenario rule results in a scenario violation (as well as a scenario cluster violation associated with that individual scenario). Violating all scenario clusters in a super scenario results in triggering (violating) the super scenario cluster.

In embodiments, the modeling system 1310 can rank the identified super scenario clusters by their effectiveness rate. Super scenario clusters which do not meet certain criteria, such as a minimum number of clusters or minimum number of triggering providers can be excluded from further analysis. In order to reduce the rate of false positives, it is useful to exclude certain potential super scenarios which are not "good enough." Where "good enough" can be evaluated by the number of scenario clusters composing the super scenario or the number of providers triggering the super scenario. The modeling system 1310 may further reduce the super scenario clusters by identifying redundancies between the super scenario clusters. For example, the modeling system 1310 can filter out super scenario cluster combinations which are deemed to be "overly similar" based upon customizable criteria, such as requiring that the composition of each super scenario must differ by at least X distinct scenario clusters. The resulting super scenario clusters can be used on their own or in combination with the individual scenario violations to score each entity to determine the likelihood of an entity performing the targeted outcome or behavior.

FIG. 13B illustrates system 1350 including further details of modeling system 1310, which may have a number of components to perform operations discussed herein including processing data, generating scenario cluster and super scenario clusters, and scoring various entities using the super scenario clusters to detect anomalies. For example, the modeling system 1310 can include a data controller 1312, a scenario controller 1314, a clustering controller 1316, a modeling controller 1318, an evaluation controller 1320, and a scoring controller 1322. The modeling system 1310 may be coupled to the data system 1330, the results system 1340, and the rules system 1350 via one or more interconnects 1301.

Figure 14:
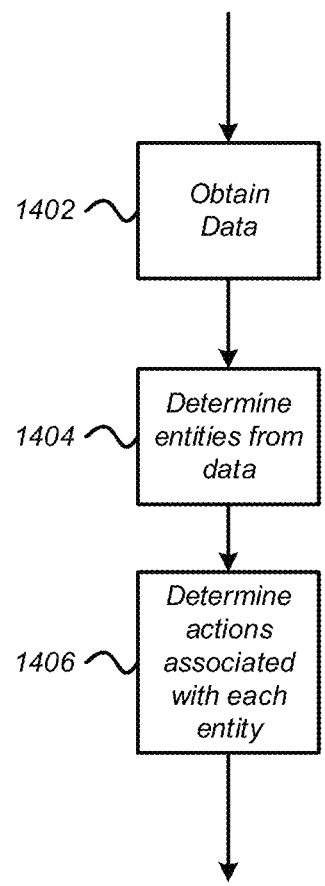
FIG. 14 illustrates an example of a logic flow to process data.

In embodiments, the modeling system 1310 including the data controller 1312 performs one or more operations to process data to detect anomalies performed by entities. In embodiments, the data controller 1312 obtains data 1332 from the data system 1330. In some embodiments, the data system 1330 may represent a number of computer systems, and the data 1332 may be obtained from various sources. FIG. 14 illustrates one possible logic flow 1400 that may occur during operation of a data collection routine performed by the data controller 1312 to generate a data set. At block 1402, the data controller 1312 may obtain data from one or more sources, such as data system 1330, which includes one or more databases, network entities, websites, data servers, and so forth. The data may be retrieved or received from a number of databases, each having different parts of the data, for example. The data 1332 may be stored in a database in a table in row/column format. Each record (row) may specify an action, and a field (column) may store an entity identifier. The table may include additional fields to information, such as a date of the action, a value (e.g., cost, score, amount) for the action, a region or area of the action, a violation indication to indicate a scenario rule violation, and so forth. At block 1404, the data controller 1312 may determine the entities in the data 1332, and at block 1406, the data controller 1312 may determine actions associated with each of the entities.

In embodiments, the entities may be different actors based on the type of data be analyzed and the type of behavior attempting to be detected. For example, if the modeling system 1310 is used to detect computer security attacks, an entity may be a person, a corporation, a website, a server, etc. that may be a target of a security attack. Specific examples may include government computer systems, bank computer systems, corporation computer systems, healthcare computer systems, an individual's computer system, or any other computing system that may store sensitive data. The actions may include all activity at the entry points to obtain access to entity's computer system. These actions may include valid login attempts, invalid login attempts, valid attempts to change passwords, invalid attempts to change passwords, phishing emails, spam emails, and so forth. The data 1332 may include other actions or activity associated with computer systems, such as measurements of outgoing network traffic, measurements of disk/memory activity, file changes in operating system or root directories, measurements of packets/Internet Protocol (IP) addresses, antivirus software activity, changes in system binaries, changing in passwords, changes in services in the operating system, and so forth.

In another tangible, real-world example, the modeling system 1310 may be utilized to detect healthcare fraud and the data 1332 may include information related to healthcare. For example, the data 1332 may include entities, such as healthcare providers, hospitals, pharmacies, doctor offices, home healthcare providers, and so forth. The actions may include payments made for services, claims made for services, actual services provided a healthcare provider, payments made for prescriptions, prescriptions prescribed, and so forth. Embodiments are not limited to these examples, and the computing systems discussed herein may be utilized to solve other computer related problems.

Figure 15:
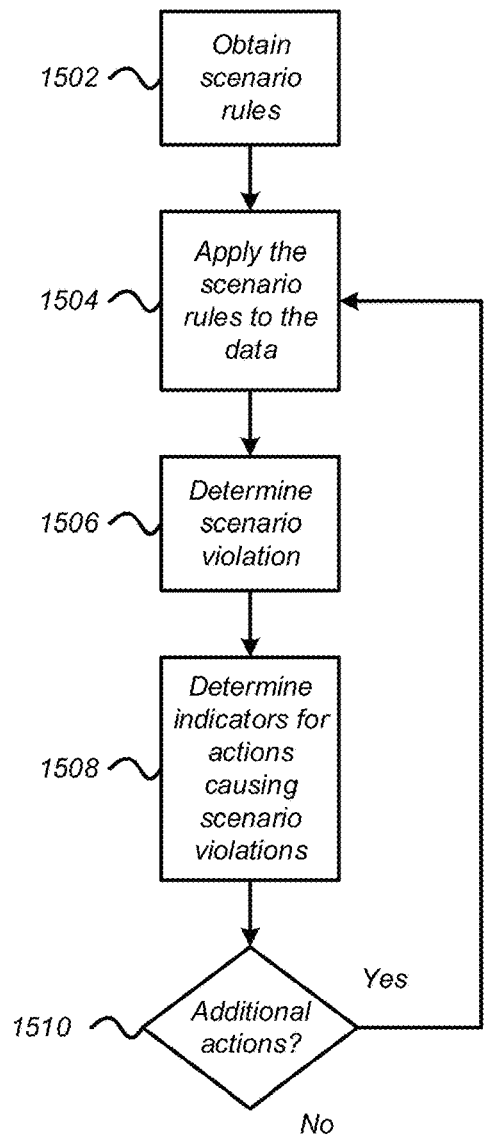
FIG. 15 illustrates an example of a logic flow to detect scenario rule violations.

In embodiments, the modeling system 1310 including the scenario controller 1314 may utilize the data 1332 to detect scenario rule violations. FIG. 15 illustrates one possible logic flow 1500 that may occur during a scenario rule operation performed by the scenario controller 1314 to apply scenario rules to the data 1332 to detect scenario violations. At block 1502, the scenario controller 1314 may obtain scenario rules 1352 from a rules system 1350. The rules system 1350 can include one or more databases, network entities, websites, data servers, and so forth. The scenario rules 1352 may include rules or definitions to detect particular actions. The rules may define threshold values for various actions to identify specific behavior. For example, a rule may include a particular number of invalid login attempts from the same IP address. If the number of attempts meets or exceeds the particular number, e.g., 50 attempts, a scenario violation occurred. Other rules may include a number of invalid attempts to change passwords, a number of phishing emails to employees. The rules may also define a threshold bandwidth measurement for outgoing network traffic, a threshold disk access measurements of disk/memory activity, a number of file changes in operating system or root directories, a number of packets measured from a particular IP address, a threshold amount of antivirus software activity (e.g., 5 alerts in a day), a number of changes in system binaries, a number of changes in passwords, a number of changes in services in the operating system, and so forth. These threshold values may be determined by a user or computing system and may be based on historical and current trends in computer hacking.

In another example, the scenario rules 1352 may define threshold values for various actions to identify healthcare insurance fraud. For examples, the scenario rules 1352 may define threshold amount paid for drugs, a threshold amount paid for services performed, a threshold amount paid for a hospital visit, a number of prescriptions made for a particular drug, a number of diagnoses for a particular disease, and so forth. Embodiments are not limited to these examples. The scenario rules 1352 may include different information to detect different behavior based on a targeted outcome.

At block 1504, the scenario controller 1314 may apply the scenario rules to the data 1332. For example, the scenario controller 1314 may apply each rule to each action in the data 1332. Further, and at block 1506, the scenario controller 1314 determines whether an action violates a scenario rule. For example, the scenario controller 1314 can determine whether the action meets and/or exceeds a threshold value for a scenario rule. At block 1508, the scenario controller 1314 may set an indicator for each action having a scenario violation. For example, the scenario controller 1314 may set a flag in a violation indication field associated with the record for the action committing the violation. At block 1510, the scenario controller 1314 determines whether any additional actions and/or entities remain in the data 1332 to evaluate. If actions and/or entities remain, the scenario controller 1314 may repeat the scenario violation detection operations, e.g., blocks 1504-1508, until all of the data 1332 is analyzed.

Figure 16:
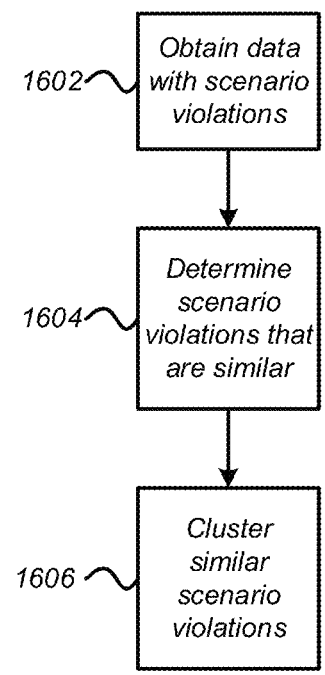
FIG. 16 illustrates an example of a logic flow to cluster scenario violations.

In embodiments, the modeling system 1310 includes a clustering controller 1316 to cluster scenario violations together in order to group scenario violations indicative of similar behavior based on a similarity threshold. FIG. 16 illustrates one possible logic flow 1600 that may occur to cluster scenario violations by the clustering controller 1316. At block 1602, the clustering controller 1316 may obtain data including the scenario violations from storage and/or memory. The clustering controller 1316 may obtain data 1332 and determine the records or actions having a violation indication set. The records not having a violation indication set may be discarded from further processing.

At block 1604 the clustering controller 1316 may determine scenario violations that are similar. In one example, there may be two actions, such as a number of incorrect password attempts exceeding a threshold, and a number of attempts to change a password exceeding a threshold. These two actions may represent similar behavior, e.g., someone attempting to access an account and can be grouped. In another example, suppose there are three distinct actions each tracking the monetary amounts associated with a known risky behavior. One is concerned with the amount allowed to be billed, one with the amount eventually billed by a healthcare provider, and one with the amount actually paid to the healthcare provider. These are three different actions they essentially represent one specific type of behavior and can be clustered together.

The clustering controller 1316 may algorithmically group existing scenario violations both among scenarios and across entities. The clustering controller 1316 may use a correlation factor between actions across all scenarios for each entity as a distance metric and utilize an Eigen value threshold as the similarity threshold to control the granularity of the resulting clusters. Actions below the Eigen value threshold are deemed similar and can be in the same cluster. More specifically, the clustering controller 1316 may cluster actions indicating as having similar behavior based on the similarity threshold at block 1606. The resulting scenario clusters are composed of individual scenario violation that represents similar entity behaviors based on the actions. Evaluating scenario clusters avoids the problem of double-counting similar scenarios without requiring domain expertise or the manual toggling of scenarios off and on. Clustering the scenario violations also reduces the number of scenario violations to be evaluated thereby shrinking the search space and computational resources required to arrive at a solution.

In instances, a single scenario can have multiple violations by an entity as well as different scenarios that essentially represent the same behavior. For example, a provider performs a certain procedure significantly more than his/her peers and is flagged as violating a scenario related to that procedure. Suppose that the particular procedure performed also necessitates use of another complementary procedure code, e.g., removing the appendix and suture patient's appendix. The traditional approach utilizing two scenarios (one for each procedure code) would result in two scenario violations. In contrast, the super scenario approach automatically clusters together those two procedure codes and triggers only a single cluster violation when either one or the other of the individual scenarios is violated. As a result, the eventual scoring code would count triggering both of the individual scenarios as a single cluster violation. Similarly, it would count triggering only one of the two procedure-based scenarios as a single cluster violation as well. If the eventual scoring code is using the number of scenario violations as an input under the traditional approach, then it would be double-counting what is essentially the same behavior whereas the super scenario approach counts this behavior only once. This can be addressed under the traditional approach by turning off one of the two closely-related scenarios, but this requires manual review and domain expertise. The super scenario approach automatically mitigates the effect of this double-counting by considering a more generalized notion of entity behavior.

Figure 17:
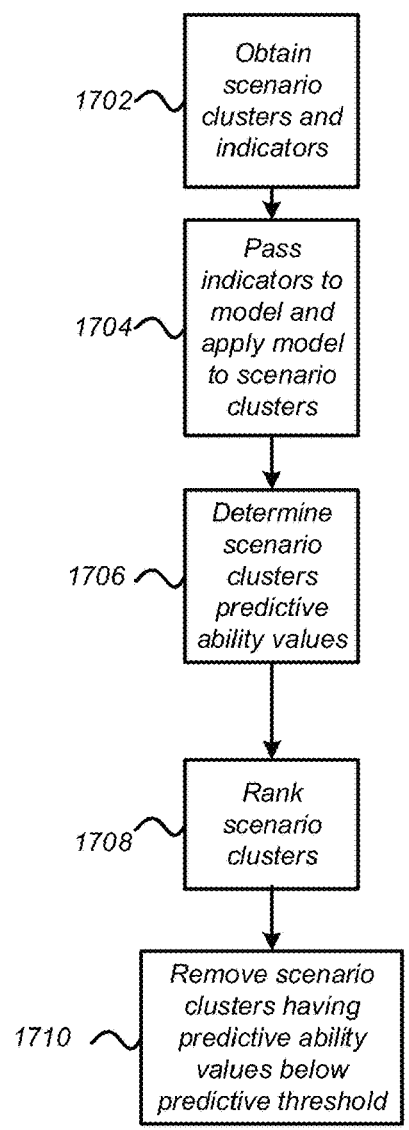
FIG. 17 illustrates an example of a logic flow to analyze predictive ability for scenario clusters.

In embodiments, the modeling system 1310 includes a modeling controller 1318 to reduce the number of scenario clusters based on those which individually exhibit some ability to predict the target outcome of interest, e.g., a security attack or fraud. FIG. 17 illustrates one possible logic flow 1700 that may occur to determine the predictive ability of scenario clusters by the modeling controller 1318. At block 1702 the modeling controller 1318 may obtain the data from storage and/or memory, the data includes scenario clusters and indicators indicating whether or not a particular scenario cluster has been triggered to predict the target outcome. In one example, the indicators are binary flags to indicate whether or not a particular scenario cluster triggered. At block 1704, the scenario clusters and the indicators are passed through a statistical model. For example, a decision tree to compute variable importance of each input or a logistic regression to determine the chi-squared statistical significance. However, embodiments are not limited to these examples. The modeling controller 1318 determines predictive ability values for the scenario cluster based on the output of the statistical model that includes the statistical significance of each cluster with respect to a target behavior of interest, e.g., abuse, security threat/attack, etc. The predictive ability values indicate a relative significance and/or variable importance between each scenario cluster to predict the target behavior.

At block 1708, the modeling controller 1318 may rank each of the scenario clusters based on the predictive ability values for the scenario clusters. For example, the scenario clusters may be ordered from the most predictive to the least predictive for a target behavior based on the predictive ability values. The resulting ranking of the scenario clusters by their relative significance and/or variable importance providing a means with which to select candidate scenario clusters to analyze further. In some embodiments, the individual clusters may be ranked by significance using a decision tree (variable importance) algorithm or a logistic regression (Wald Chi-Square) algorithm. However, embodiments are not limited in this manner.

At block 1710, the modeling controller 1318 may remove scenario clusters from further analysis that have a predictive ability value below a predictive threshold. The predictive threshold may be a number of scenario clusters, a percentage threshold, and so forth. For example, the modeling controller 1318 may select the top x out of a total y clusters, e.g., the top 3 clusters out of 5 clusters. In another example, a percentage of the total clusters may be selected for further analysis, e.g., the top 60% of clusters. The predictive threshold is a hyper parameter chosen in order to reduce the search space to a manageable level. The predictive threshold not determined by the model but traditional notions about appropriate statistical significance can be applied, e.g., p-value <0.5 or VIP>0. In one example, the predictive threshold may be at a level that indicates any statistical significance. Moreover, the predictive threshold is set to exclude clusters which do not show any relationship with the target behavior of interest, e.g., those that do not show any association better than random chance. This method of pre-screening to determine the predictive ability for each of the scenario clusters allows for a drastic reduction in the search space for the subsequent exhaustive assessment. For example, the number of potential scenario permutations may be reduced from 500! or $1.22 \times 10^{1,134}$ down to 50! or $3.04 \times 10^{64}$—a reduction in computational complexity from one that is entirely infeasible to one that is feasible.

Figure 18:
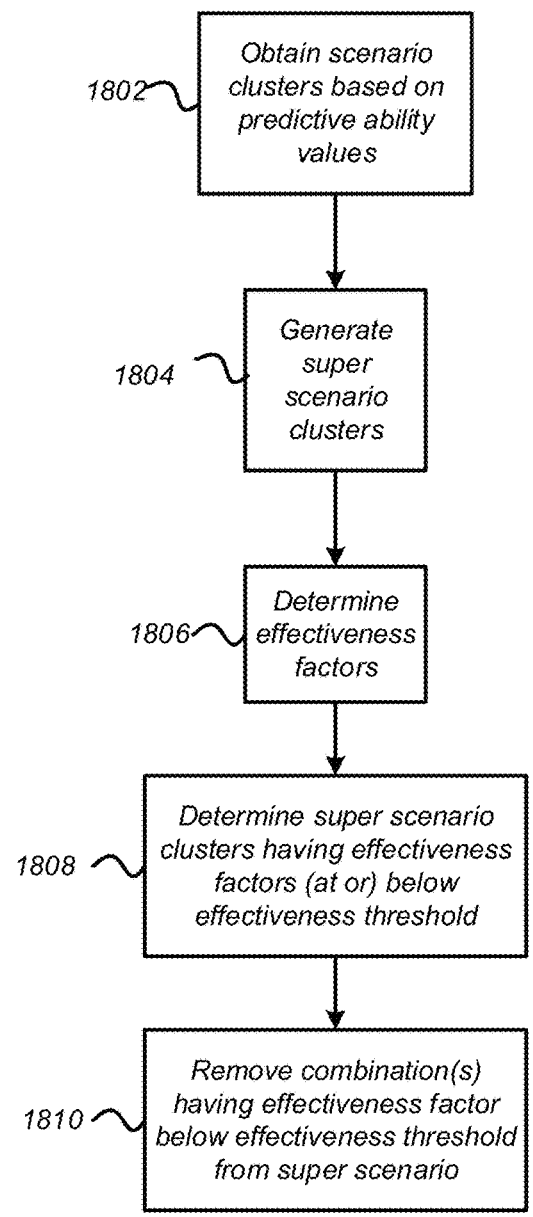
FIG. 18 illustrates an example of a logic flow to process super scenario clusters.

In embodiments, the modeling system 1310 includes an evaluation controller 1320 to further process the selected predictive scenario clusters. The evaluation controller 1320 may determine a predictive ability for every combination of clusters. FIG. 18 illustrates one possible logic flow 1800 that may occur to further analyze the selected scenario clusters by the evaluation controller 1320. At block 1802, the evaluation controller 1320 may obtain selected predictive scenario clusters based on the predictive ability values from storage and/or memory. At block 1804 the evaluation controller 1320 may generate super scenario clusters including one or more clusters. More specifically, the super scenario clusters include one or more of the selected scenario clusters. In embodiments, the evaluation controller 1320 may generate every possible combination of scenario clusters with the selected scenario clusters, and each one of the combinations of scenario clusters is a super scenario cluster.

The evaluation controller 1320 may compute an effectiveness factor for each of the super scenario clusters at block 1806. The effectiveness factor represents the number of entities who committed a target behavior or anomaly of interest, e.g., security violation, fraud, etc., as a percentage of all the entities which violated that particular super scenario cluster being evaluated. The super scenario clusters can be ranked by their effectiveness factor, and super scenario clusters that do not meet certain criteria, e.g., have an effectiveness factor below an effectiveness threshold may be removed from further use at blocks 1808 and 1810. In one example, two super scenarios may be produce based on all the provider and scenario violation data. The modeling system 1310 may process the data and determine ten entities violated the first super scenario (SS1) that is constructed and eight of them are known to be guilty of fraud. For the second super scenario (SS2) that 100 providers violated but only three entities in that SS2 were known to be guilty. The modeling system 1310 including the evaluation controller 1320 can compute a relative risk measure and further discard SS2 in order to reduce the false positives that are surfaced to the end user. Moreover, the evaluation controller 1320 may remove super scenario clusters having less than a minimum number of scenario clusters or less than a minimum number of entities triggering the scenario cluster. The evaluation controller 1320 may further reduce the number of super scenario clusters that are considered redundant. For example, the evaluation controller 1320 may filter out super scenario clusters deemed to be "overly similar" based upon customizable criteria, such as requiring that the composition of each super scenario cluster must differ by at least X distinct scenario clusters.

Figure 19:
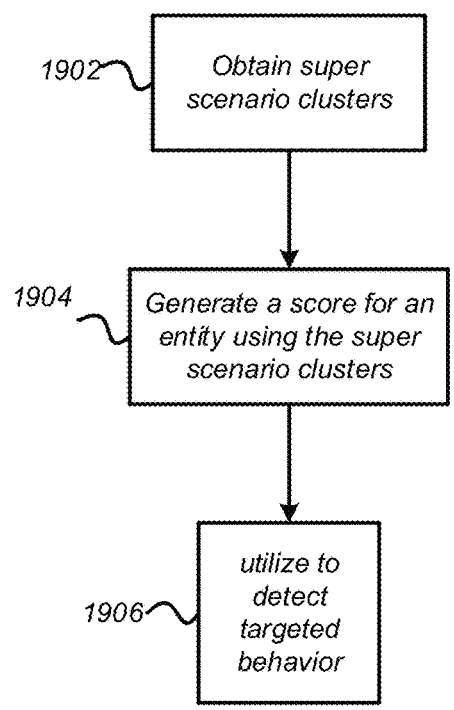
FIG. 19 illustrates an example of a logic flow to score an entity based on the super scenario clusters.

In embodiments, the modeling system 1310 includes a scoring controller 1322 to score each entity in the data 1332 using the super scenario combinations. In some instances, the processing flows as illustrated in FIGS. 14-18 may be repeated for each entity type of interest to produce customized super scenario clusters for each entity type. For example, certain super scenario cluster combinations may be more indicative of our outcome of interest for home health care providers than they would be for pharmacies. The resulting super scenarios can then be used on their own or in combination with the individual scenario violations in order to score each entity. FIG. 19 illustrates one possible logic flow 1900 that may occur to score entities by the scoring controller 1322. At block 1902, the scoring controller 1322 may obtain data and the super scenario clusters generated for an entity from storage and/or memory. At block 1904, the scoring controller 1322 may generate a score for an entity using the super scenario clusters. In some instances, the scoring controller 1322 may also use individual scenario violations to generate a score. In an example, the scoring controller 1322 may compute a score based on a weighted average of either the number of distinct super scenarios triggered, a potential dollar amount loss associated with each super scenario violation, or a combination of the two. The score indicates the likelihood that the entity committed the target behavior or behavior and may be used by the scoring controller 1322 to detect the behavior at block 1906. For example, the score may indicate a likelihood that a website experienced a security attack. In another example, the score may indicate a likelihood that a healthcare provider committed fraud. Embodiments are not limited to these examples.

Figure 20A:
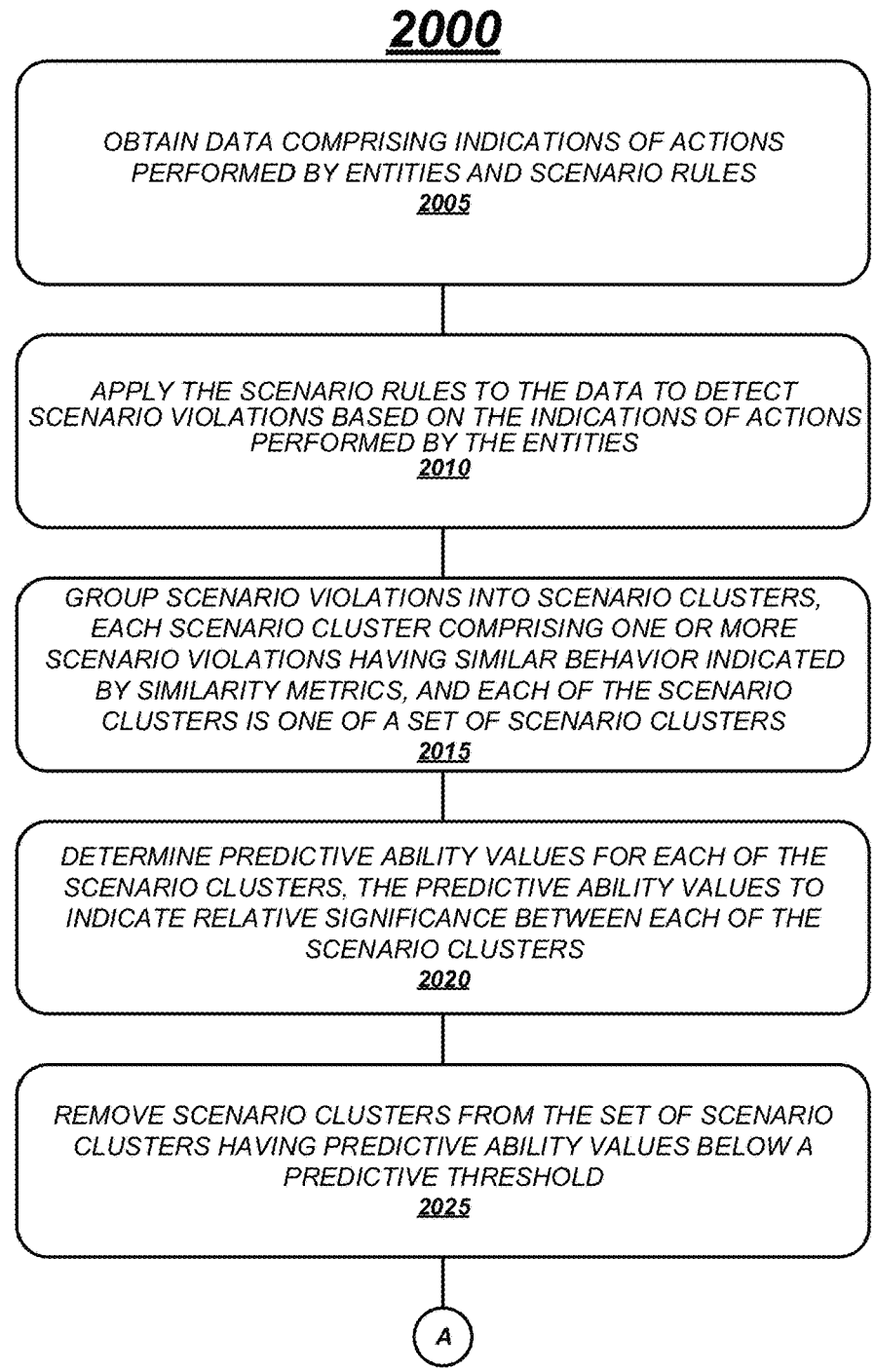
FIGS. 20A/20B illustrate an example of a logic flow to process data, generate super scenario clusters, and score entities.
Figure 20B:
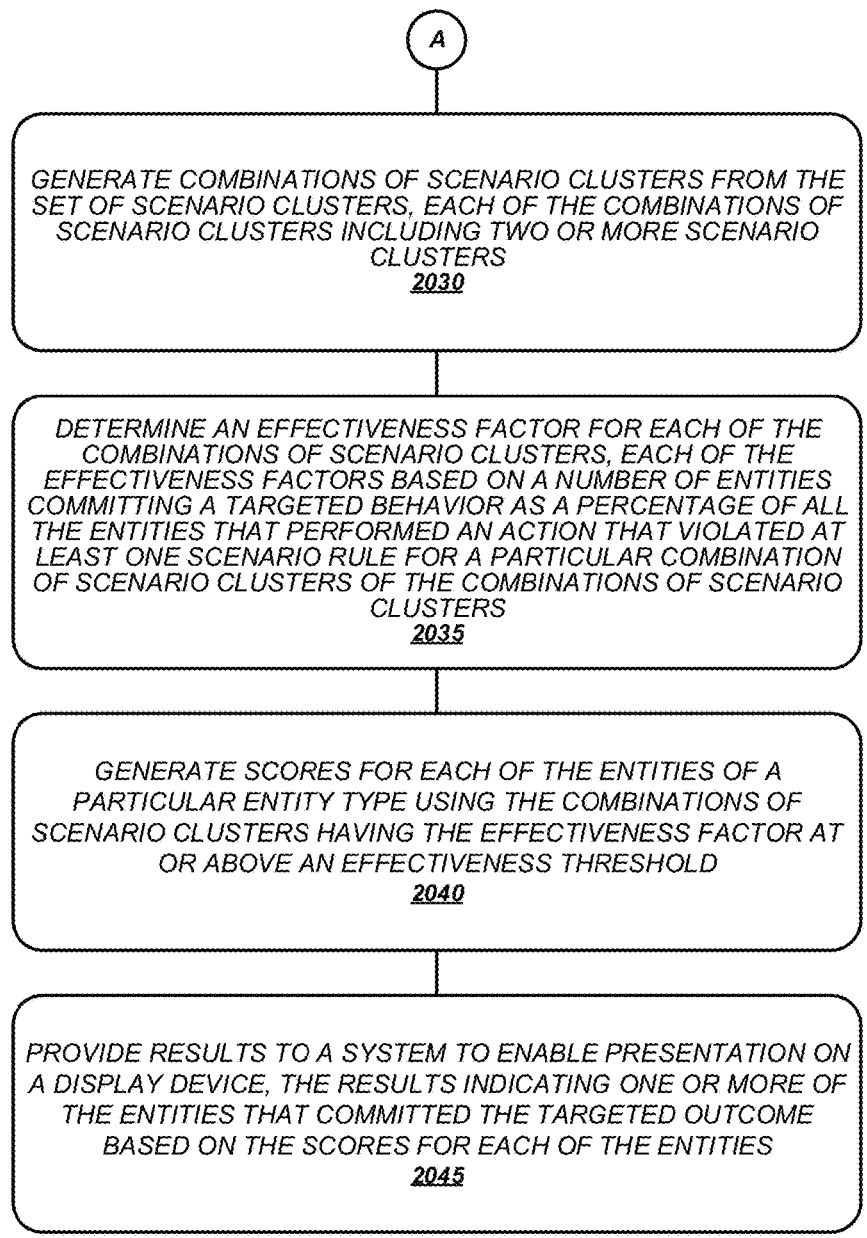

FIGS. 20A/20B illustrate an example of a logic flow 2000. The logic flow 2000 may be representative of some or all of the operations executed by one or more embodiments described herein. For example, the logic flow 2000 may illustrate operations performed by the modeling system 1310, as discussed in Figures FIGS. 13A-19, and FIGS. 21-25. In the illustrated embodiment shown in FIGS. 20A/20B, the logic flow 2000 may include obtaining data comprising indications of actions performed by entities and scenario rules at block 2005. Further and a block 2010, the logic flow 2000 includes applying the scenario rules to the data to detect scenario violations based on the indications of actions performed by the entities. For example, a system may compare each of the scenario rules to each of the actions to determine whether an action violated a scenario rule. The scenario rules may define threshold values and specific events that may be associated with the target behavior.

At block 2015, the logic flow 2000 includes grouping scenario violations into scenario clusters, each scenario cluster comprising one or more scenario violations having similar behavior indicated by similarity metrics, and each of the scenario clusters is one of a set of scenario clusters. For example, a system may algorithmically group existing scenario violations both among scenarios and across entities. The system may use a correlation factor between actions across all scenarios for each entity as a distance metric and utilize Eigen value threshold as the similarity threshold to control the granularity of the resulting clusters. Actions below the Eigen value threshold are deemed similar and can be in the same cluster.

The logic flow 2000 includes determining predictive ability values for each of the scenario clusters, the predictive ability values to indicate relative significance between each of the scenario clusters at block 2020. For example, the system may pass the scenario clusters and the indicators through a statistical model. The system determines predictive ability values for the scenario cluster based on the output of the statistical model. The predictive ability values indicate a relative significance and/or variable importance between each scenario cluster to predict the target behavior. At block 2025, the logic flow 2000 includes removing scenario clusters from the set of scenario clusters having predictive ability values below a predictive threshold. For example, the system may rank each of the scenario clusters based on the predictive ability values for the scenario clusters. The scenario clusters may be ordered from the most predictive to the least predictive for a target behavior based on the predictive ability values. The resulting ranking of the scenario clusters by their relative significance and/or variable importance providing a means with which to select candidate scenario clusters to analyze further. The system modeling may remove scenario clusters from further analysis that have a predictive ability value below a predictive threshold.

At block 2030, the logic flow 2000 includes generating combinations of scenario clusters from the set of scenario clusters, each of the combinations of scenario clusters including two or more scenario clusters. In embodiments, a system may generate every possible combination of scenario clusters with the selected scenario clusters, and each one of the combinations of scenario clusters is a super scenario cluster. Further and at block 2035, the logic flow 2000 includes determining an effectiveness factor for each of the combinations of scenario clusters, each of the effectiveness factors based on a number of entities committing a targeted behavior as a percentage of all the entities that performed an action that violated at least one scenario rule for a particular combination of scenario clusters of the combinations of scenario clusters. The super scenario clusters can be ranked by their effectiveness factor and super scenario clusters which do not meet certain criteria, e.g., have an effectiveness factor below an effectiveness threshold may be removed from further evaluation. The system may also remove super scenario clusters having less a minimum number of scenario clusters or less than minimum number of triggering scenario cluster. The system may further reduce the number of super scenario clusters that are considered redundant.

At block 2040, the logic flow includes generating scores for each of the entities of a particular entity type using the combinations of scenario clusters having the effectiveness factor at or above an effectiveness threshold. Further and at block 2045, the logic flow 2000 includes providing results to a system to enable presentation on a display device, the results indicating one or more of the entities that committed the targeted outcome based on the scores for each of the entities. For example, the results may be passed to a display system having a display to present to user. In another example, the results including the scores may be passed to a storage system and stored in a database or different data structure for further use to identify a target behavior. Embodiments are not limited to these examples.

FIG. 21 illustrates an example system processing flow 2100 to process data and generate super scenario clusters to score entities. In the illustrated system processing flow 2100, a data controller 1312 may obtain data from one or more sources, such as data system 1330 at line 2102. The data may include actions associated with one or more entities. At line 2104, the processing flow 2100 may include applying scenario rules 2101 to the actions of the data 1332. More specifically, the scenario controller 1314 may apply the scenario rules 2101 to detect one or more scenario violations 2103. In the illustrated example, scenario rules A-G are indicated as being violated or triggered.

In embodiments, the processing flow 2100 includes generating scenario clusters 2105 by the clustering controller 1316 at line 2106. For example, the scenarios are clustered together by a distance metric to form scenario clusters which are representative of similar entity behavior. The number of clusters produced are determined by a maximum Eigenvalue threshold, typically equal to 1. The clustering controller 1316 may determine scenario violations that are similar. More specifically, the clustering controller 1316 may use a correlation factor between actions across all scenarios for each entity as a distance metric and utilize an Eigen value threshold as the similarity threshold to control the granularity of the resulting clusters. The scenarios are clustered together by a distance metric to form scenario clusters which are representative of similar entity behavior. The number of clusters produced are determined by a maximum Eigenvalue threshold, typically equal to 1. FIG. 22 illustrates an example clustering 2200 of scenario violations. In the illustrated example, the similarity metric 2202 may be an Eigen value threshold, and actions below the Eigen value threshold are deemed similar and can be in the same cluster. In this example, four clusters are generated, cluster 1 2204-1 including scenario A and scenario B, cluster 2 2204-2 including scenario C, cluster 3 2204-3 including scenario D and scenario E, and cluster 4 2204-4 including scenario F and scenario G. As illustrated in FIG. 22 each of the clusters 2204 include scenarios which are determined to be similar based on the similarity metric 2202. The resulting scenario clusters are composed of individual scenario violations which represent similar entity behaviors based on the actions. Embodiments are not limited to the above example, in some instances a different similarity metric 2202 may be utilized, such as a specified maximum number of clusters, a specified minimum number of clusters, or a minimum proportion of variation explained by each cluster.

The similarity metric is a distance metric showing how "alike" two clusters are. This can be based on various measures, one example being the dollar amount loss associated with each scenario for each entity or the number of scenario violations for each entity. The cutoff shown is determined by either the maximum second eigenvalue, the minimum/maximum number of clusters desired, or the necessary minimum proportion of variation explained by the cluster. These are pre-chosen hyper parameters.

Figure 23A:
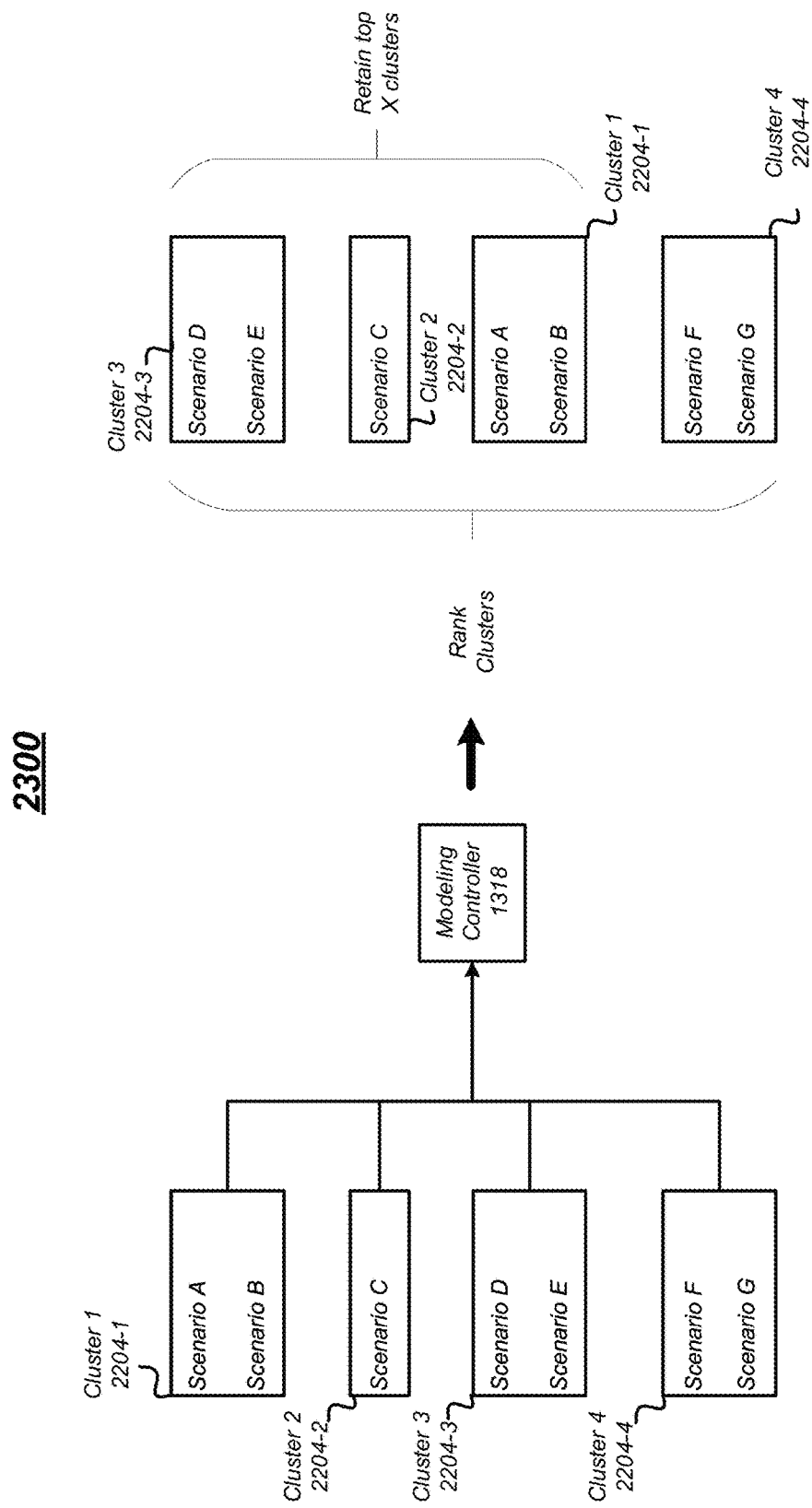
FIG. 23A illustrates an example of a processing flow to determine predictive clusters.

With reference to FIG. 21, the processing flow 2100 includes the modeling controller 1318 determining predictive clusters 2107 at line 2108. Scenario clusters are evaluated on a univariate basis via a decision tree or logistic regression approach. This uses binary cluster violation flags as input to assess significance with respect to the target behavior of interest. The least predictive scenario clusters are discarded. FIG. 23 illustrates an example processing flow 2300 of a modeling controller 1318 determine the predictive ability of each of the clusters generated in FIG. 22. The modeling controller 1318 may obtain the scenario clusters 2204-1 through 2204-4 and indicators, e.g., the binary cluster violation flags, indicating whether or not a particular scenario cluster has been triggered to predict the target behavior. The modeling controller 1318 may pass the scenario clusters 2204-1 through 2204-4 and the indicators through a statistical model, e.g., a decision tree to compute variable importance of each input or a logistic regression to determine the chi-squared statistical significance. The modeling controller 1318 determines predictive ability values for the scenario clusters 2204-1 through 2204-4 based on the output of the statistical model. The predictive ability values indicate a relative significance and/or variable importance between each scenario cluster to predict the target behavior.

As illustrated, the modeling controller 1318 may rank each of the scenario clusters 2204-1 through 2204-4 based on the predictive ability values. For example, the scenario clusters 2204-1 through 2204-4 may be ordered from the most predictive to the least predictive for a target behavior based on the predictive ability values. In the illustrated example, cluster 3 2204-3 may be the most predictive, cluster 2 2204-2 may be the next most predictive, cluster 1 2204-1, and cluster 4 2204-4 may be the least predictive. The resulting ranking of the scenario clusters by their relative significance and/or variable importance provides a means with which to select candidate scenario clusters to further analyze by the modeling controller 1318. For example, the modeling controller 1318 may remove scenario cluster 4 2204-4 from further analysis.

FIG. 23B illustrates an example table 2350 indicating rankings of clusters based on predictive ability values. In the illustrated example, the clusters are ranked from the most predictive at the top of the table to the least predictive at the bottom of the table, as illustrated by the "imp_rank" column of the table. These rankings may be based on the predictive ability values that are illustrated in the "Importance" column of the table. Other columns of the table 2350 include a "Name" column specifying a name of a cluster, a "Label" column specifying any label for a cluster, a "Nrules" column indicating a number of rules violated, a "Nsurrogates" column indicating a number of surrogates, and a "Cluster ID" column specifying a cluster ID for a cluster. As previously discussed the predictive ability values are the relative significance between the clusters. Table 2350 illustrates one possible ranking based on predictive ability values. However, embodiments are not limited in this manner.

With reference to FIG. 21, the processing flow 2100 includes the evaluation controller 1320 generating super scenario clusters 2109 at line 2110. The super scenario clusters 2109 include one or more of the selected or predictive scenario clusters 2107. In embodiments, the evaluation controller 1320 may generate every possible combination of scenario clusters with the selected scenario clusters, and each one of the combinations of scenario clusters is a super scenario cluster. All possible combinations of scenario clusters are evaluated to produce super scenario clusters (clusters of clusters) which indicate combinations of entity behavior which are most associated with an outcome of interest.

Figure 24:
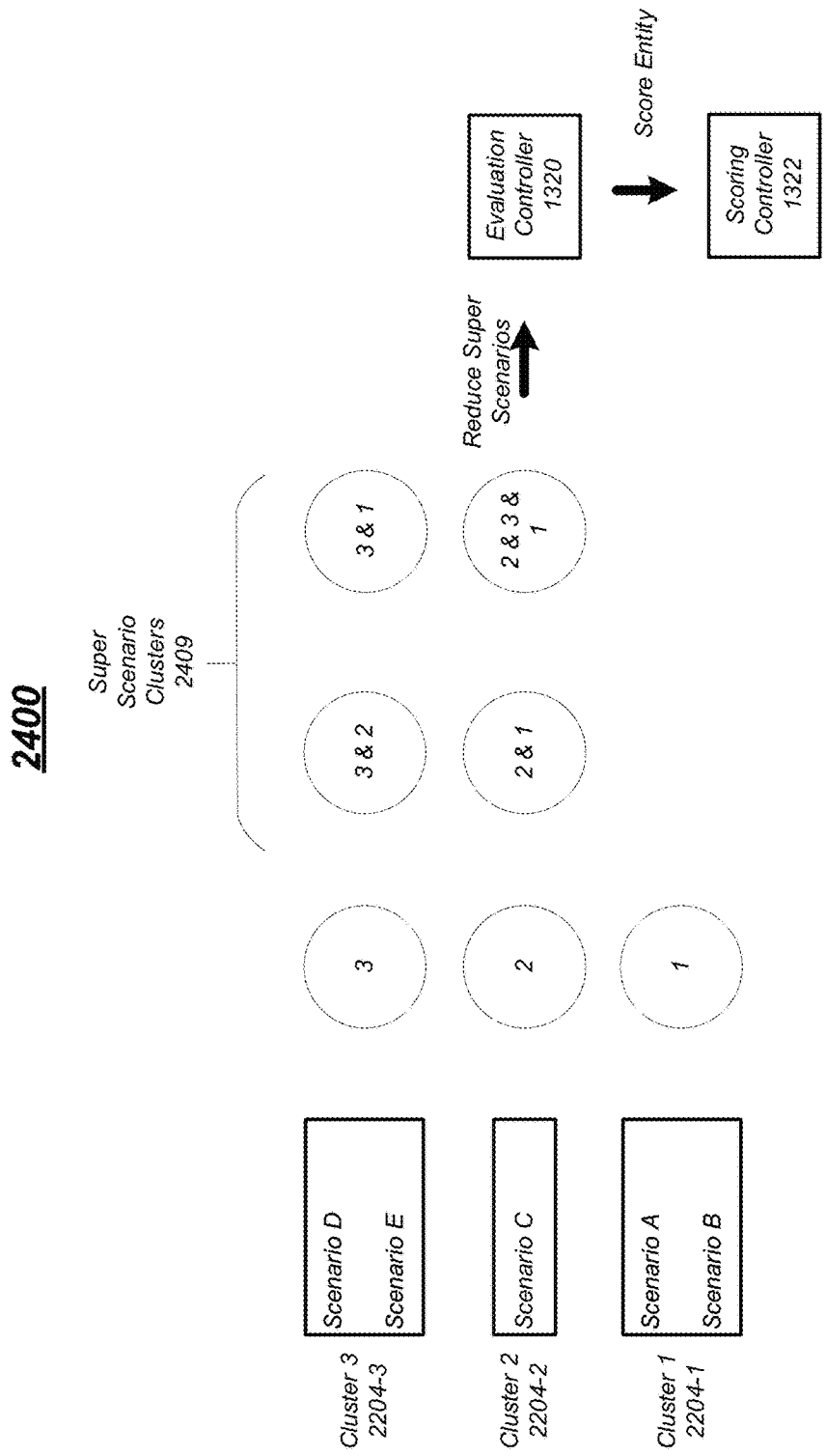
FIG. 24 illustrates an example of a processing flow to generate super scenarios.

FIG. 24 illustrates an example processing flow 2400 to generate super scenario clusters using cluster 1 2204-1, cluster 2 2204-2, and cluster 3 2204-3, the predictive scenario clusters. As illustrated, four super scenario clusters 2409 may be generated. A first super scenario cluster may include cluster 3 2204-3 and cluster 2 2204-2, a second super scenario cluster may include cluster 3 2204-3 and cluster 1 2204-1, a third super scenario cluster may include cluster 2 2204-2 and cluster 1 2204-1, and a fourth super scenario cluster may include cluster 3 2204-3, cluster 2 2204-2, and cluster 1 2204-1.

In embodiments, the evaluation controller 1320 reduce the number of super scenario clusters. For example, the evaluation controller 1320 may compute an effectiveness factor for each of the super scenario clusters 2409. The effectiveness factor represents the number of entities who committed a target behavior or anomaly of interest as a percentage of all the entities which violated that particular super scenario cluster being evaluated. The super scenario clusters 2409 can be ranked by their effectiveness factor and super scenario cluster that do not meet certain criteria, e. g., have an effectiveness factor below an effectiveness threshold may be removed.

Additional criteria may be a minimum number of scenario clusters or minimum number of triggering scenario cluster. The evaluation controller 1320 may further reduce the number of super scenario clusters 2409 that are considered redundant. For example, the evaluation controller 1320 may filter out super scenario clusters 2409 deemed to be "overly similar" based upon customizable criteria, such as requiring that the composition of each super scenario cluster must differ by at least X distinct scenario clusters. The remaining super scenario clusters 2409 may be passed to the scoring controller 1322 and used to generate a score for an entity.

In embodiments, the processing flow 2100 of FIG. 21 also includes the scoring controller 1322 receiving the remaining super scenario clusters at line 2112. The scoring controller 1322 may obtain data and the super scenario clusters and may generate a score for an entity using the super scenario clusters. In some instances, the scoring controller 1322 may also use individual scenario violations to generate a score. The score indicates the likelihood that the entity committed the target behavior or behavior and may be used by the scoring controller 1322 to detect the behavior. For example, the score may indicate a likelihood that a website experienced a security attack. In another example, the score may indicate a likelihood that a healthcare provider committed fraud. Embodiments are not limited to these examples. The results 2111 including a score for the entity may be passed to a results system and a display 2114 for presentation on a display device.

Figure 25:
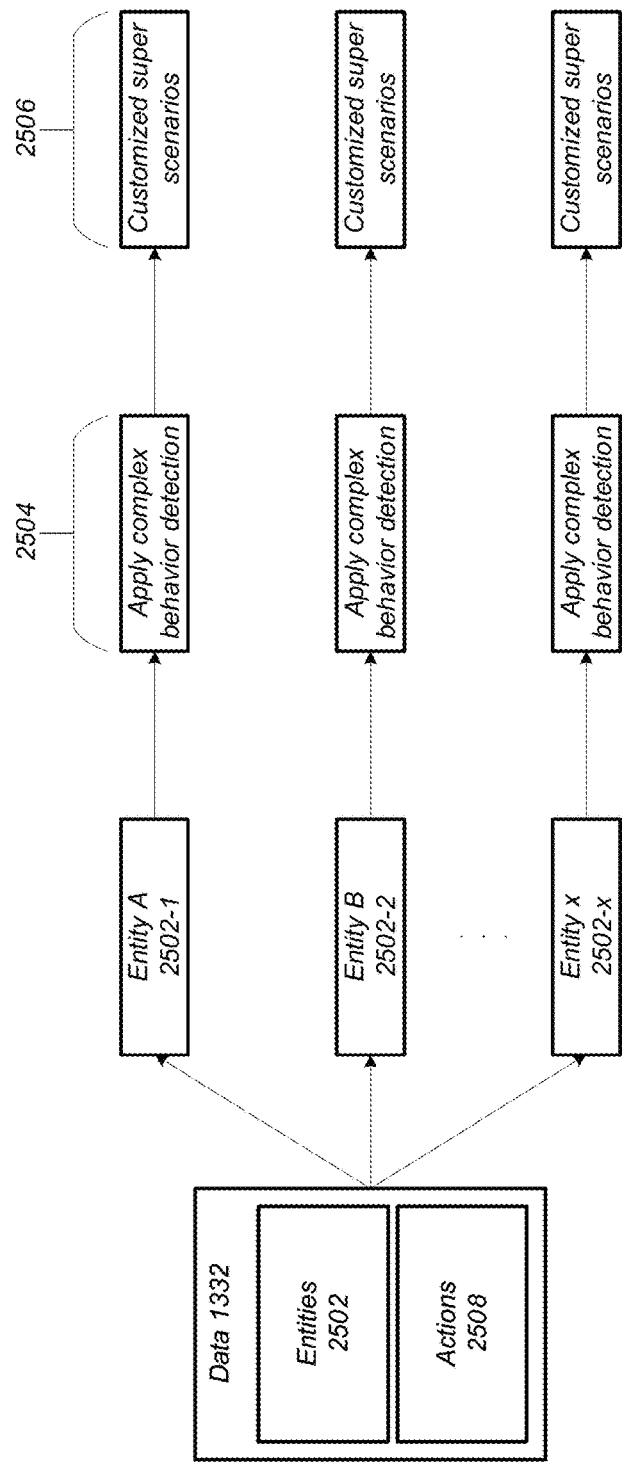
FIG. 25 illustrates an example of a processing flow to score entities.

FIG. 25 illustrates an example of a processing flow 2500 that may be performed by one or more systems discussed herein to generate customized super scenarios 2506 for each of a plurality of entities 2502. More specifically, one or more operations discussed herein may be performed a number of times to apply complex behavior detection 2504 and generate customized super scenario scenarios for each entity 2502. Suppose you have data on hospital facilities, physicians, pharmacies, and dentists. Utilizing the super scenario approach discussed herein on data will likely produce worse results as opposed to utilizing the approach on each of the four subsets of entity types. Customization refers to looping over each entity type and iteratively running the super scenario approach on each subset separately. In the illustrated example, one or more systems discussed herein, such as systems 1300 and 1350, may receive data 1332 including one or more entities 2502 and actions 2508 performed by the entities. The systems may perform complex behavior detection 2504 for each of the entities 2502. For example, the systems may apply complex behavior detection for Entity A 2502-1 and generate customized super scenario clusters 2506 for Entity A 2502-1. Similarly, the systems may apply complex behavior detection for Entity B 2502-2 and generate different customized super scenario clusters 2506. The systems may perform complex behavior detections for any number of entities 2502-x based on the number of entities in the data 1332. An example of complex behavior is an entity who engaged in a combination of specific types of behavior (behavior A, B, and C). In this example, engaging in behavior A and C is multiplicatively more suspicious than simply engaging in either behavior A or C on its own.

Figure 26:
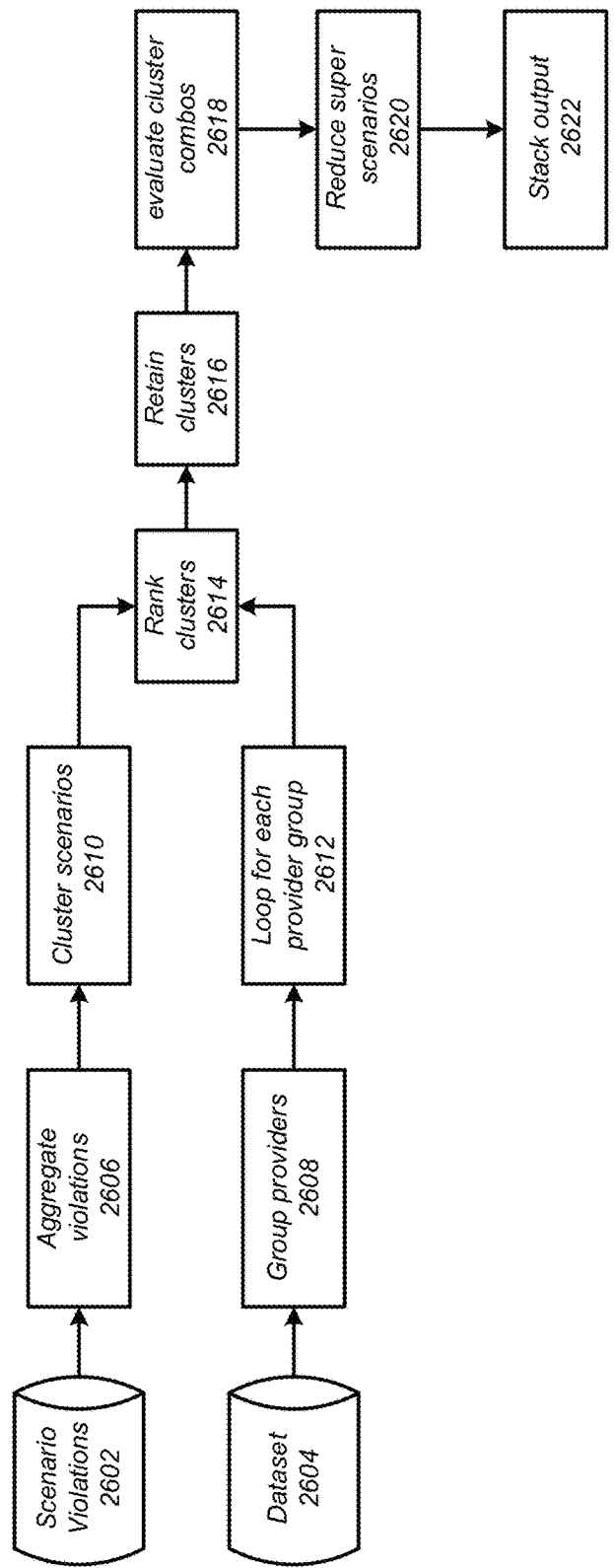
FIG. 26 illustrates an example of a processing flow.

FIG. 26 illustrates an example of a processing flow 2600. The logic flow 2600 may be representative of some or all the operations executed by one or more embodiments described herein. For example, the logic flow 2600 may illustrate operations performed by the modeling system 1310, as discussed in Figures FIGS. 13A-25.

At block 2606, the processing flow 2600 includes obtaining and aggregating data including rules and the scenario violations 2602, which may be stored in one or more data stores. In embodiments, the scenario violations are actions performed by an entity that violates a scenario rule. The scenario violations may be by provider or entity and scenario.

In embodiments, the processing flow 2600 includes clustering the scenario violations at block 2610. For example, the modeling system 1310 may obtain the scenario violations and determine scenario violations that are similar. More specifically, the modeling system 1310 may algorithmically group scenario violations by determining correlation factors between actions across all scenario violations as a distance metric. The distance metric may be utilized with an Eigen value threshold to control the granularity of the resulting clusters. For example, actions below the Eigen value threshold are deemed similar and can be in the same cluster of scenario violations. The resulting scenario clusters are composed of individual scenario violation which represents similar entity behaviors based on the actions.

The processing flow 2600 includes ranking the resulting scenario clusters based on their predictive ability at block 2614. For example, the modeling system 1310 may obtain scenario clusters and indicators and pass the scenario clusters, and the indicators are passed through a statistical model. In embodiments, the modeling system 1310 may determine the predictive ability values for each of the scenario clusters based on the output of the statistical model. Moreover, the predictive ability values indicate a relative significance and/or variable importance between each scenario cluster to predict a target behavior. The modeling system 1310 may rank each of the scenario clusters based on the predictive ability values for the scenario clusters. For example, the scenario clusters may be ordered from the most predictive to the least predictive for a target behavior based on the predictive ability values. The resulting ranking of the scenario clusters by their relative significance and/or variable importance providing a means with which to select candidate scenario clusters to analyze further. In some embodiments, the individual clusters may be ranked by significance using a decision tree (variable importance) algorithm or a logistic regression (Wald Chi-Square) algorithm. However, embodiments are not limited in this manner.

In embodiments, the modeling controller 1318 may remove scenario clusters from further analysis that have a predictive ability value below a predictive threshold and retain the remaining scenario clusters at block 2616. The predictive threshold may be a number of scenario clusters, a percentage threshold, and so forth. For example, the modeling system 1310 may select the top x out of a total y clusters, e.g., the top 3 clusters out of 5 clusters. In another example, a percentage of the total clusters may be selected for further analysis, e.g., the top 60% of clusters.

At block 2618, the processing flow 2600 includes generating and evaluating cluster combinations, e.g., super scenario clusters. The modeling system 1310 performs further analysis on the selected scenario clusters by generating super scenario clusters including one or more clusters. The super scenario clusters include one or more of the selected or remaining scenario clusters that have a predictive ability value above the predictive threshold. In embodiments, the modeling system 1310 may generate every possible combination of scenario clusters with the selected scenario clusters, and each one of the combinations of scenario clusters is a super scenario cluster.

In embodiments, the modeling system 1310 computes an effectiveness factor for each of the super scenario clusters. The effectiveness factor represents the number of entities who committed a target behavior or anomaly of interest as a percentage of all the entities which violated that particular super scenario cluster being evaluated. The super scenario clusters 2409 can be ranked by their effectiveness factor and super scenario cluster that do not meet certain criteria, e.g., have an effectiveness factor below an effectiveness threshold may be removed. Thus, at block 2620, the modeling system 1310 may remove super scenario clusters having less than a minimum number of scenario clusters or less than minimum number of triggering scenario cluster. The modeling system 1310 may further reduce the number of super scenario clusters that are considered redundant. For example, the modeling system 1310 may filtering out super scenario clusters deemed to be "overly similar" based upon customizable criteria, such as requiring that the composition of each super scenario cluster must differ by at least X distinct scenario clusters, requiring that the super scenario results achieve a certain true positive rate, a certain maximum level of provider exposure (exclude super scenarios that 50% of all entities trigger), and so forth.

In embodiments, the modeling system 1310 includes scoring each entity in the targeted dataset 2604 using the super scenario combinations. In some instances, the processing flow 2600 may be repeated or looped for each entity type of interest to produce customized super scenario clusters for each entity type at blocks 2608 and 2612. An entity type may be determined, and the data may be divided into subsets, each corresponding with an entity, e.g., pharmacies vs. dentist, etc. The super scenario operations, e.g., blocks 2602 through 2622 may be repeated for each of identified entity types using the corresponding subset of data. Certain super scenario cluster combinations may be more indicative of our outcome of interest for home health care providers than they would be for pharmacies. The resulting super scenarios can then be used on their own or in combination with the individual scenario violations in order to score each entity. More specifically, one or more operations discussed herein may be performed a number of times to apply complex behavior detection and generate customized super scenario scenarios for each entity type. Thus, blocks 2606 through 2620 may be repeated for each entity type, and the results may be stacked at block 2622 and provided to a user, such as a person or entity trying to detect the targeted behavior. For example, the modeling system 1310 may perform a number of iterations, each iteration to process entities of a particular entity type. During each iteration, the modeling system 1310 may determine another subset of the data associated with entities of a particular entity type, and apply scenario rules to the subset of the data to determine new scenario violations for the entities of the entity type.

The modeling system 1310 may generate new scenario clusters by grouping the new scenario violations based on similarity metrics, as similarly discussed above. The modeling system 1310 may also rank the new scenario clusters based on predictive ability values for the new scenario clusters and remove new scenario clusters from the set of new scenario clusters having predictive ability values below the predictive threshold. In embodiments, the modeling system 1310 may generate new combinations of scenario clusters, each new combination of scenario clusters to include one or more new scenario clusters, and determine effectiveness factors the new combinations of scenario clusters, each of the effectiveness factors based on a number of entities of the other entity type committing the targeted behavior as a percentage of all the entities of the other entity type that committed at least one scenario violation for a particular combination of scenario clusters of the new combinations of scenario clusters. The modeling system 1310 to generate scores for each of the entities of the other entity type using the new combinations of scenario clusters having the effectiveness factor at or above an effectiveness threshold, and perform another iteration until scores are generated for every entity of every entity type. Embodiments are not limited in this manner.

Embodiments discussed herein may also include the logic to generate the models and make predictions for a target variable. Other embodiments include a computer-implemented method, and/or at least one non-transitory computer-readable storage medium having instructions that when executed cause processing circuitry to perform the various operations discussed herein. These embodiments may provide technical advantages over previous systems by enabling a user of the system to interact with decision tree data structures to flag anomalies in real-time. The techniques described herein may also provide a holistic view of the most suspicious behavior associated with an entity while avoiding overwhelming the user with an abundance of overly-detailed information. The proposed techniques can also circumvent the problem of needing excessive compute time requirements in processing the data and rules for complex behaviors in a computer-based fraud, cyber-security, and other behavioral detection systems, and there can be an intermediate model that can speed up the runtime of the system while maximizing the signal.

As discussed, some systems may use Hadoop®, an open-source framework for storing and analyzing big data in a distributed computing environment to generate models and probabilities of occurrence as discussed herein. Some systems may use cloud computing, which can enable ubiquitous, convenient, on-demand network access to a shared pool of configurable computing resources (e.g., networks, servers, storage, applications, and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

What is claimed is:

1. An apparatus, comprising:
   processing circuitry; and
   memory to store instructions that, when executed by the processing circuitry, cause the processing circuitry to:
   obtain scenario rules and data representing actions performed by entities;
   apply the scenario rules to a subset of the data to detect scenario violations based on the actions performed by the entities, the subset of the data associated with the entities of a particular entity type;
   group scenario violations into scenario clusters, each scenario cluster comprising one or more scenario violations associated with similar behavior performed by the entities indicated by similarity metrics, and each of the scenario clusters is one of a set of scenario clusters;
   determine predictive ability values for each of the scenario clusters, the predictive ability values to indicate relative significance between each of the scenario clusters to predict a target behavior;
   rank the scenario clusters based on the predictive ability values and remove scenario clusters from the set of scenario clusters having predictive ability values below a predictive threshold;
   generate combinations of scenario clusters from the set of scenario clusters, each of the combinations of scenario clusters including two or more scenario clusters;
   determine an effectiveness factor for each of the combinations of scenario clusters, each of the effectiveness factors based on a number of entities committing the targeted behavior as a percentage of all the entities that committed at least one scenario violation for a particular combination of scenario clusters of the combinations of scenario clusters;
   generate scores for each of the entities of the particular entity type using the combinations of scenario clusters having the effectiveness factor at or above an effectiveness threshold; and
   provide results to a system to enable presentation on a display device, the results indicating one or more of the entities that committed the targeted behavior based on the scores for each of the entities.

2. The apparatus of claim 1, wherein the similarity metrics to indicate correlation distances for the scenario violations, the scenario violations having a similarity metric below an eigen value threshold are grouped into a same scenario cluster.

3. The apparatus of claim 1, the processing circuitry to:
   obtain the scenario rules and the data from one or more data system coupled via one or more network connections; and
   apply the scenario rules to the actions by comparing each indication of an action to each scenario rule to determine whether an entity committed a scenario violation, wherein the scenario rules define activity to detect the targeted behavior.

4. The apparatus of claim 3, the processing circuitry to generate indicators for entities committing scenario violations based on applying the scenario rules, each indicator to indicate an entity committed a scenario violation.

5. The apparatus of claim 4, the processing circuitry to:
   pass each indicator for each of the scenario clusters through a statistical model to determine the predictive ability values for the scenario clusters, each indicator to indicate whether a scenario cluster is triggered to predict the targeted behavior, rank each of the scenario clusters based on the predictive ability values by relative significance, and remove scenario clusters having predictive ability values below the predictive threshold.

6. The apparatus of claim 1, the processing circuitry to exhaustively generate the combinations of scenario clusters, each of the combinations comprising one or more scenario clusters.

7. The apparatus of claim 1, the processing circuitry to determine one or more combinations of scenario clusters having overlapping scenario clusters, and to discard combinations of scenario clusters that are entirely overlapped by two or more other scenario clusters or entirely overlapped by another combination of scenario cluster.

8. The apparatus of claim 1, wherein the effectiveness threshold is a minimum number of scenario clusters required for a combination of scenario clusters, and the processing circuitry to determine a number of scenario clusters in each of the combinations of scenario clusters, and discard each of the combinations of scenario clusters having the number of scenario clusters below the minimum number of scenario clusters.

9. The apparatus of claim 1, wherein the effectiveness threshold is a minimum number of violating entities required for a combination of scenario clusters, and the processing circuitry to determine a number of violating entities for each of the combination of scenario clusters, and discard each of the combinations of scenario clusters having the number of violating entities below the minimum number of violating entities.

10. The apparatus of claim 1, the processing circuitry to iteratively generate scores for every entity of every entity type, during each iteration the processing circuitry to:
determine another subset of the data associated with entities of another entity type;
apply the scenario rules to the other subset of the data to determine new scenario violations for the entities of the other entity type;
generate new scenario clusters by grouping the new scenario violations based on similarity metrics;
rank the new scenario clusters based on predictive ability values for the new scenario clusters and remove scenario clusters from a set of new scenario clusters having predictive ability values below the predictive threshold;
generate new combinations of scenario clusters, each new combination of scenario clusters to include one or more new scenario clusters;
determine effectiveness factors the new combinations of scenario clusters, each of the effectiveness factors based on a number of entities of the other entity type committing the targeted behavior as a percentage of all the entities of the other entity type that committed at least one scenario violation for a particular combination of scenario clusters of the new combinations of scenario clusters;
generate scores for each of the entities of the other entity type using the new combinations of scenario clusters having the effectiveness factor at or above an effectiveness threshold; and
perform another iteration until scores are generated for every entity of every entity type.

11. A computer-implemented, comprising:
obtaining scenario rules and data representing actions performed by entities;
applying the scenario rules to a subset of the data to detect scenario violations based on the actions performed by the entities, the subset of the data associated with the entities of a particular entity type;
grouping scenario violations into scenario clusters, each scenario cluster comprising one or more scenario violations associated with similar behavior performed by the entities indicated by similarity metrics, and each of the scenario clusters is one of a set of scenario clusters;
determining predictive ability values for each of the scenario clusters, the predictive ability values to indicate relative significance between each of the scenario clusters to predict a target behavior;
ranking the scenario clusters based on the predictive ability values and removing scenario clusters from the set of scenario clusters having predictive ability values below a predictive threshold;
generating combinations of scenario clusters from the set of scenario clusters, each of the combinations of scenario clusters including two or more scenario clusters;
determining an effectiveness factor for each of the combinations of scenario clusters, each of the effectiveness factors based on a number of entities committing the targeted behavior as a percentage of all the entities that committed at least one scenario violation for a particular combination of scenario clusters of the combinations of scenario clusters;
generating scores for each of the entities of the particular entity type using the combinations of scenario clusters having the effectiveness factor at or above an effectiveness threshold; and
providing results to a system to enable presentation on a display device, the results indicating one or more of the entities that committed the targeted behavior based on the scores for each of the entities.

12. The computer-implemented method of claim 11, wherein the similarity metrics to indicate correlation distances for the scenario violations, the scenario violations having a similarity metric below an eigen value threshold are grouped into a same scenario cluster.

13. The computer-implemented method of claim 11, comprising:
obtaining the scenario rules and the data from one or more data system coupled via one or more network connections; and
applying the scenario rules to the actions by comparing each indication of an action to each scenario rule to determine whether an entity committed a scenario violation, wherein the scenario rules define activity to detect the targeted behavior.

14. The computer-implemented method of claim 13, comprising generating indicators for entities committing scenario violations based on applying the scenario rules, each indicator to indicate an entity committed a scenario violation.

15. The computer-implemented method of claim 14, comprising:
passing each indicator for each of the scenario clusters through a statistical model to determine the predictive ability values for the scenario clusters, each indicator to indicate whether a scenario cluster is triggered to predict the targeted behavior,
ranking each of the scenario clusters based on the predictive ability values by relative significance, and
removing scenario clusters having predictive ability values below the predictive threshold.

16. The computer-implemented method of claim 11, comprising exhaustively generating the combinations of scenario clusters, each of the combinations comprising one or more scenario clusters.

17. The computer-implemented method of claim 11, comprising determining one or more combinations of scenario clusters having overlapping scenario clusters, and to discard combinations of scenario clusters that are entirely overlapped by two or more other scenario clusters or entirely overlapped by another combination of scenario cluster.

18. The computer-implemented method of claim 11, comprising determining a number of scenario clusters in each of the combinations of scenario clusters, and discarding each of the combinations of scenario clusters having the number of scenario clusters below a minimum number of scenario clusters, wherein the effectiveness threshold is the minimum number of scenario clusters required for a combination of scenario clusters.

19. The computer-implemented method of claim 11, comprising determining a number of violating entities for each of the combination of scenario clusters, and discarding each of the combinations of scenario clusters having the number of violating entities below a minimum number of violating entities, wherein the effectiveness threshold is the minimum number of violating entities required for a combination of scenario clusters.

20. The computer-implemented method of claim 11, comprising iteratively generating scores for every entity of every entity type, during each iteration:
  determining another subset of the data associated with entities of another entity type;
  applying the scenario rules to the other subset of the data to determine new scenario violations for the entities of the other entity type;
  generating new scenario clusters by grouping the new scenario violations based on similarity metrics;
  ranking the new scenario clusters based on predictive ability values for the new scenario clusters and remove scenario clusters from a set of new scenario clusters having predictive ability values below the predictive threshold;
  generating new combinations of scenario clusters, each new combination of scenario clusters to include one or more new scenario clusters;
  determining effectiveness factors the new combinations of scenario clusters, each of the effectiveness factors based on a number of entities of the other entity type committing the targeted behavior as a percentage of all the entities of the other entity type that committed at least one scenario violation for a particular combination of scenario clusters of the new combinations of scenario clusters;
  generating scores for each of the entities of the other entity type using the new combinations of scenario clusters having the effectiveness factor at or above an effectiveness threshold; and
  performing another iteration until scores are generated for every entity of every entity type.

21. At least one non-transitory computer-readable storage medium comprising instructions that when executed cause processing circuitry to:
  obtain scenario rules and data representing actions performed by entities;
  apply the scenario rules to a subset of the data to detect scenario violations based on the actions performed by the entities, the subset of the data associated with the entities of a particular entity type;
  group scenario violations into scenario clusters, each scenario cluster comprising one or more scenario violations associated with similar behavior performed by the entities indicated by similarity metrics, and each of the scenario clusters is one of a set of scenario clusters;
  determine predictive ability values for each of the scenario clusters, the predictive ability values to indicate relative significance between each of the scenario clusters to predict a target behavior;
  rank the scenario clusters based on the predictive ability values and removing scenario clusters from the set of scenario clusters having predictive ability values below a predictive threshold;
  generate combinations of scenario clusters from the set of scenario clusters, each of the combinations of scenario clusters including two or more scenario clusters;
  determine an effectiveness factor for each of the combinations of scenario clusters, each of the effectiveness factors based on a number of entities committing the targeted behavior as a percentage of all the entities that committed at least one scenario violation for a particular combination of scenario clusters of the combinations of scenario clusters;
  generate scores for each of the entities of the particular entity type using the combinations of scenario clusters having the effectiveness factor at or above an effectiveness threshold; and
  provide results to a system to enable presentation on a display device, the results indicating one or more of the entities that committed the targeted behavior based on the scores for each of the entities.

22. The non-transitory computer-readable storage medium of claim 21, wherein the similarity metrics to indicate correlation distances for the scenario violations, the scenario violations having a similarity metric below an eigen value threshold are grouped into a same scenario cluster.

23. The non-transitory computer-readable storage medium of claim 21, comprising instructions that when executed cause the processing circuitry to:
  obtain the scenario rules and the data from one or more data system coupled via one or more network connections; and
  apply the scenario rules to the actions by comparing each indication of an action to each scenario rule to determine whether an entity committed a scenario violation, wherein the scenario rules define activity to detect the targeted behavior.

24. The non-transitory computer-readable storage medium of claim 23, comprising instructions that when executed cause the processing circuitry to generate indicators for entities committing scenario violations based on applying the scenario rules, each indicator to indicate an entity committed a scenario violation.

25. The non-transitory computer-readable storage medium of claim 24, comprising instructions that when executed cause the processing circuitry to:
  pass each indicator for each of the scenario clusters through a statistical model to determine the predictive ability values for the scenario clusters, each indicator to indicate whether a scenario cluster is triggered to predict the targeted behavior,
  rank each of the scenario clusters based on the predictive ability values by relative significance, and
  remove scenario clusters having predictive ability values below the predictive threshold.

26. The non-transitory computer-readable storage medium of claim 21, comprising instructions that when executed cause the processing circuitry to exhaustively generate the combinations of scenario clusters, each of the combinations comprising one or more scenario clusters.

27. The non-transitory computer-readable storage medium of claim 21, comprising instructions that when executed cause the processing circuitry to determine one or more combinations of scenario clusters having overlapping scenario clusters, and to discard combinations of scenario clusters that are entirely overlapped by two or more other scenario clusters or entirely overlapped by another combination of scenario cluster.

28. The non-transitory computer-readable storage medium of claim 21, comprising instructions that when executed cause the processing circuitry to determine a number of scenario clusters in each of the combinations of scenario clusters, and discarding each of the combinations of scenario clusters having the number of scenario clusters below a minimum number of scenario clusters, wherein the effectiveness threshold is the minimum number of scenario clusters required for a combination of scenario clusters.

29. The non-transitory computer-readable storage medium of claim 21, comprising instructions that when executed cause the processing circuitry to determine a number of violating entities for each of the combination of scenario clusters, and discarding each of the combinations of scenario clusters having the number of violating entities below a minimum number of violating entities, wherein the effectiveness threshold is the minimum number of violating entities required for a combination of scenario clusters.

30. The non-transitory computer-readable storage medium of claim 21, comprising instructions that when executed cause the processing circuitry to iteratively generate scores for every entity of every entity type, during each iteration the processing circuitry to:
   determine another subset of the data associated with entities of another entity type;
   apply the scenario rules to the other subset of the data to determine new scenario violations for the entities of the other entity type;
   generate new scenario clusters by grouping the new scenario violations based on similarity metrics;
   rank the new scenario clusters based on predictive ability values for the new scenario clusters and remove scenario clusters from a set of new scenario clusters having predictive ability values below the predictive threshold;
   generate new combinations of scenario clusters, each new combination of scenario clusters to include one or more new scenario clusters;
   determine effectiveness factors the new combinations of scenario clusters, each of the effectiveness factors based on a number of entities of the other entity type committing the targeted behavior as a percentage of all the entities of the other entity type that committed at least one scenario violation for a particular combination of scenario clusters of the new combinations of scenario clusters;
   generate scores for each of the entities of the other entity type using the new combinations of scenario clusters having the effectiveness factor at or above an effectiveness threshold; and
   perform another iteration until scores are generated for every entity of every entity type.

\* \* \* \* \*